Oct. 25, 1966    A. W. KYLLONEN    3,280,944
SPRING-APPLIED POWER RELEASED VEHICLE
WHEEL TREAD BRAKE ASSEMBLY
Filed Nov. 27, 1964    7 Sheets-Sheet 7

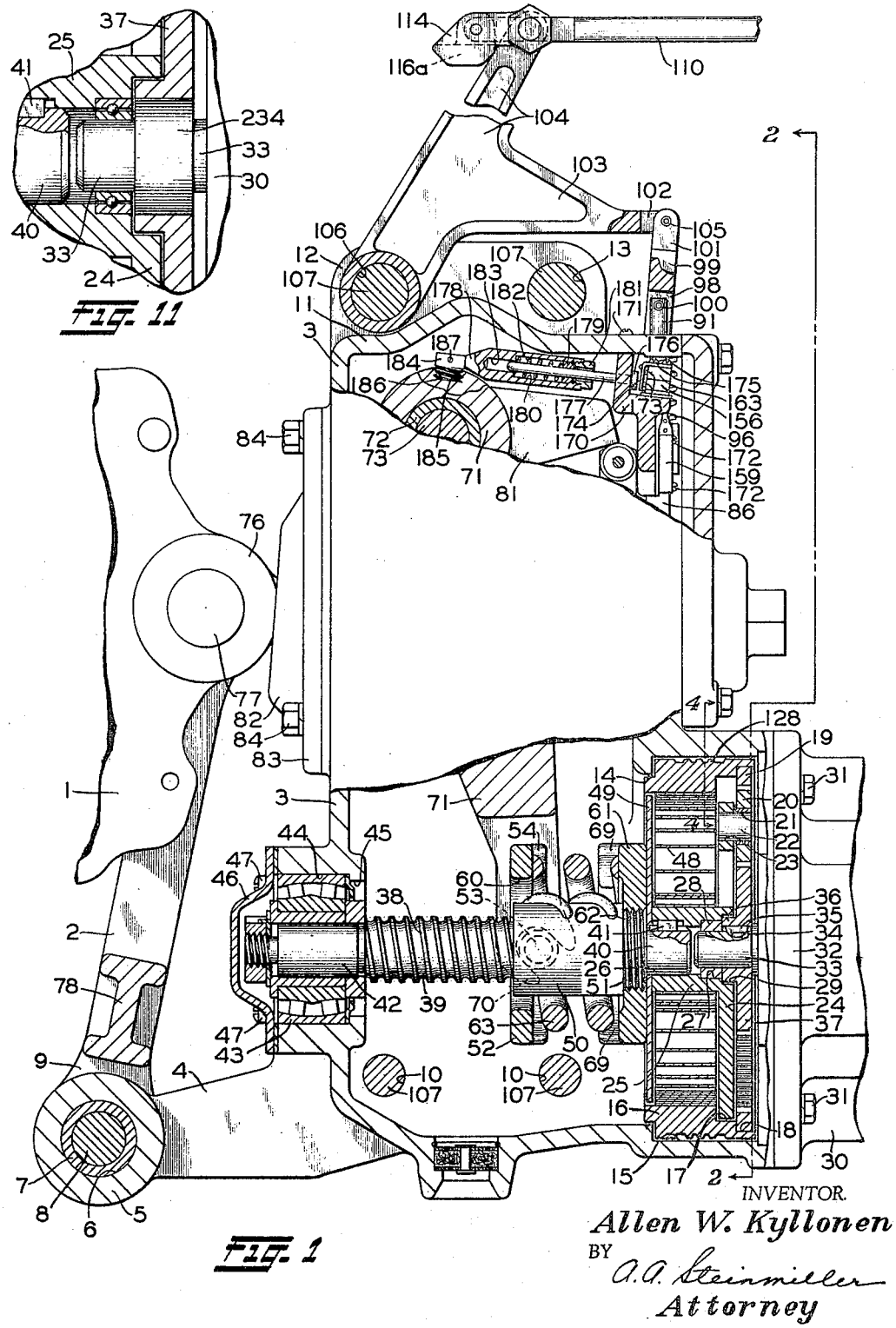

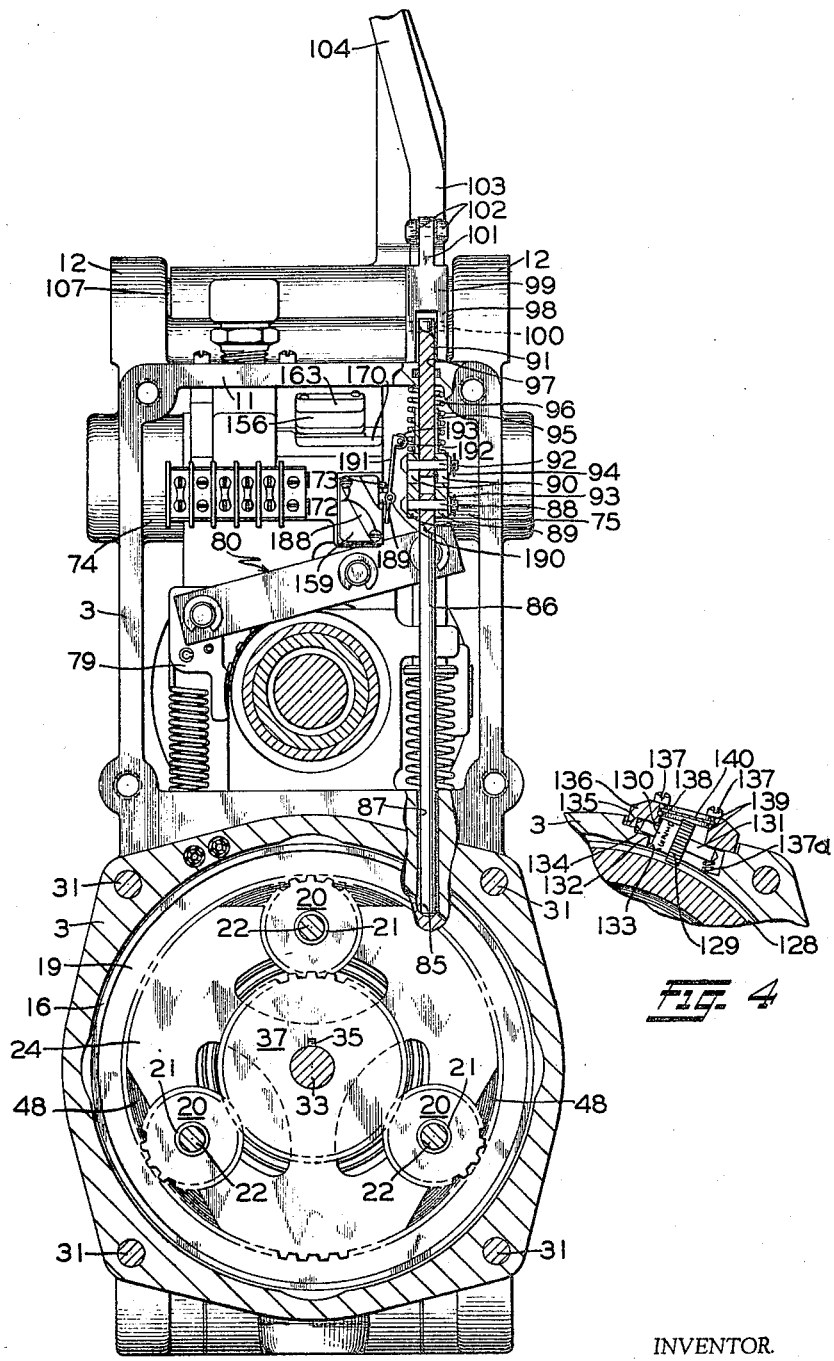

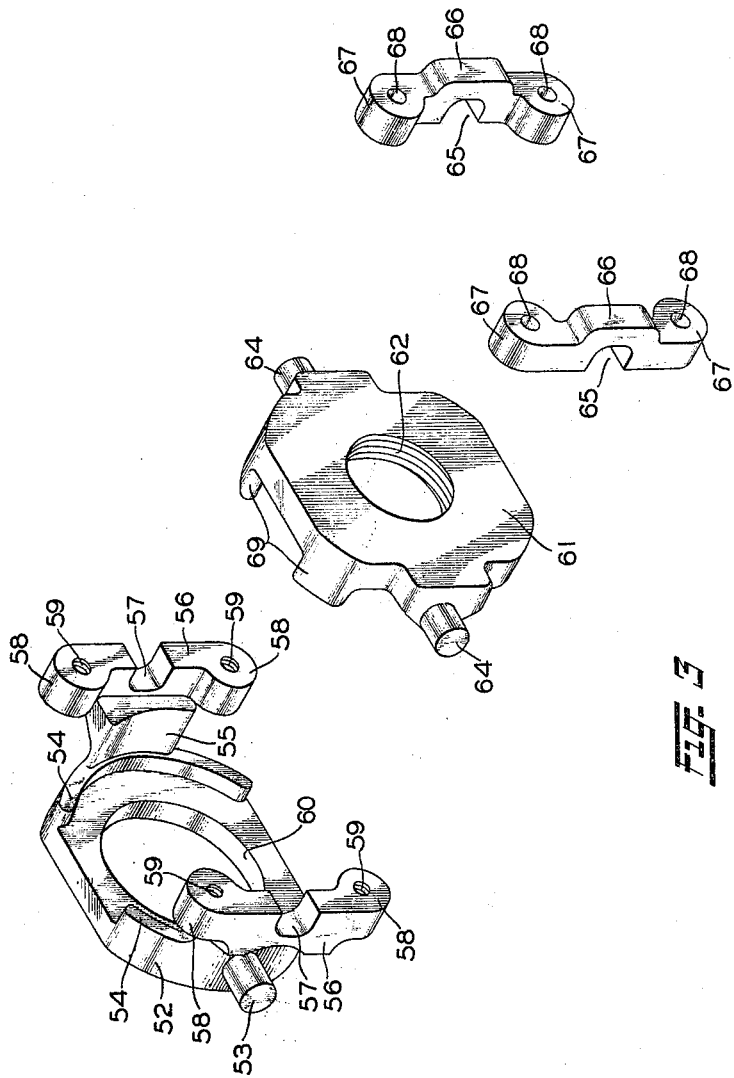

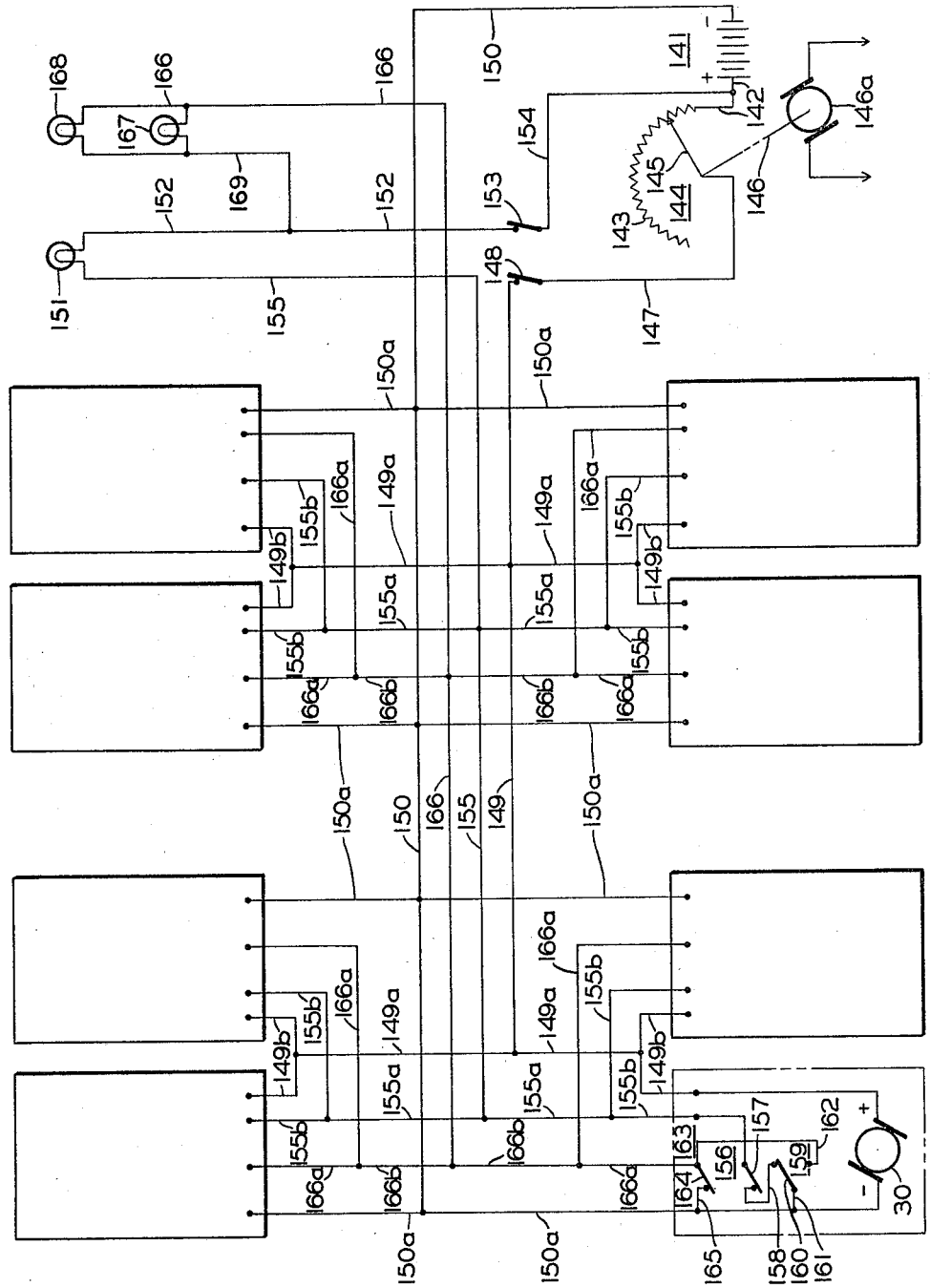

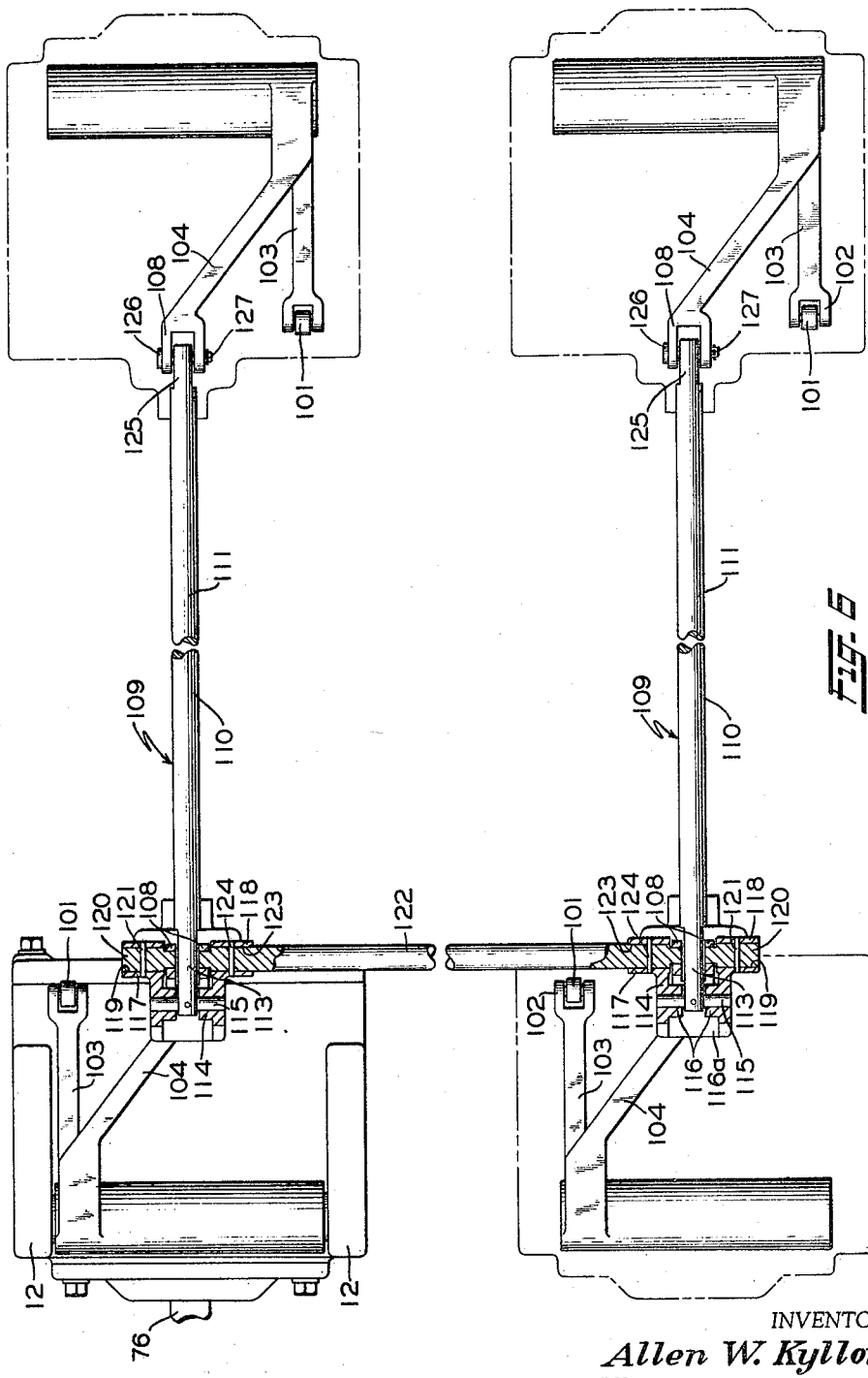

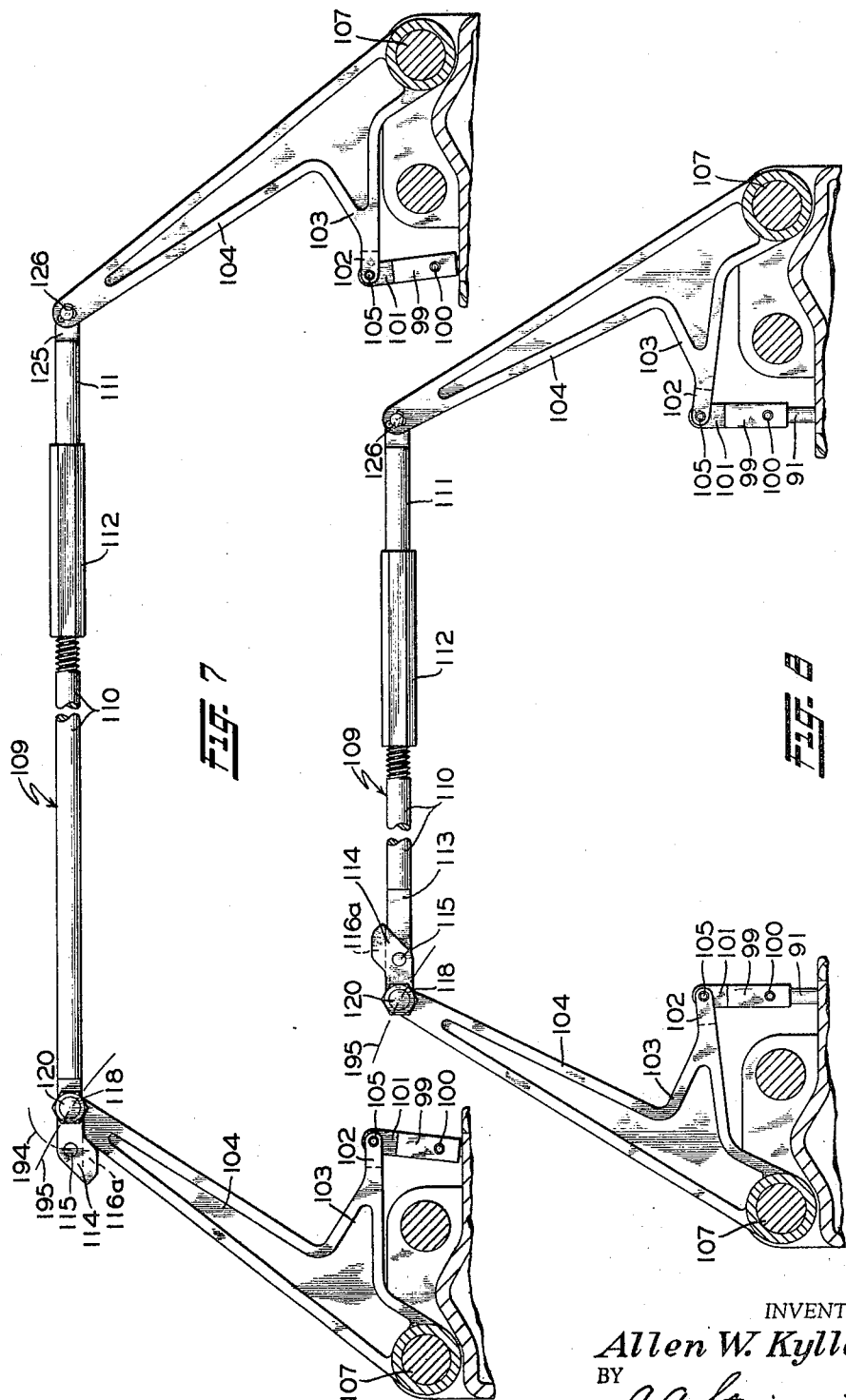

INVENTOR.
Allen W. Kyllonen
BY
A. A. Steinmiller
Attorney

United States Patent Office 3,280,944
Patented Oct. 25, 1966

3,280,944
SPRING-APPLIED POWER RELEASED VEHICLE
WHEEL TREAD BRAKE ASSEMBLY
Allen W. Kyllonen, Pittsburgh, Pa., assignor to Westinghouse Air Brake Company, Wilmerding, Pa., a corporation of Pennsylvania
Filed Nov. 27, 1964, Ser. No. 414,170
24 Claims. (Cl. 188—171)

This invention relates to electrically controlled brake systems for railway rolling stock, and, more particularly, to electrically controlled brake systems employing so-called spring-applied power-released package brake assemblies wherein the brake mechanism is mounted or contained in a casing for installation on the car truck and removal therefrom as a unit.

In the copending application Serial No. 335,070 Patent No. 3,217,843 issued November 15, 1965 to George K. Newell and Allen W. Kyllonen, and assigned to the assignee of the present application, there is shown and described for railway rolling stock a novel package brake assembly for each individual wheel of a railway car. This brake assembly provides for normally maintaining the brake released by power means in the form of an electrical torque motor operably connected to a spiral spring for effecting the windup thereof and to a screw on which is mounted a traveling nut that has a yieldable connection, in the form of a cushioned spring means, with a pivoted bell-crank brake lever. One arm of the bell-crank brake lever is connected by a ball-and-socket joint to a brake rod pivotally connected at one end to a brake-shoe-carrying brake head. The other arm of the bell-crank lever has a lost-motion connection with one arm of a second pivoted bell-crank lever. A force may be manually applied via a hand brake lever mechanism to the other arm of this second bell-crank lever for effecting, via the two bell-crank levers and the lost-motion connection therebetween, a reduction in or a release of the spiral spring brake-applying force subsequent to the loss of electrical power to the torque motor.

In the above-mentioned Patent No. 3,217,843, a brake assembly as described above is provided for each wheel of a railway car truck. The hand brake levers of the several brake assemblies are connected together through a system of levers and links comprising the hand brake mechanism to the hand brake wheel located at the corresponding end of the car. Therefore, subsequent to an electric power failure, the spring forces acting to press the several brake shoes against their respective corresponding wheels nay be manually simultaneously reduced or partly relieved or released in order that the railway car may be moved to a railway shop for repair.

It is the general purpose of this invention to provide a novel spring-applied power-released brake assembly. This brake assembly has an improved and novel yieldable connection or cushioning means, capable of transmitting greater forces or heavier loads than the cushioning means disclosed in the above-mentioned Patent No. 3,217,843 interposed between a brake lever operatively connected to a brake-shoe-carrying brake head and a traveling nut mounted on a screw. The novel brake assembly of the present invention further comprises an electrical torque motor which drives the screw and also effects the windup of a spiral spring. The torque motor is connected to the screw and to the opposite ends of the spiral spring through a planetary gear unit or train that includes a rotatably mounted spring barrel to which one end of the spiral spring is secured, the spring barrel constituting the internal gear of the gear train. The opposite end of the spiral spring is anchored to a hub formed integral with the planet gear carrier of the gear train, this hub being mounted on the screw and keyed thereto. The armature shaft of the torque motor has mounted on one end thereof the sun gear of the gear train. Therefore, windup of the spiral spring can be selectively varied in accordance with a corresponding variation in the current supplied to the torque motor.

The brake assembly of the type mentioned above, one of which is provided for each wheel of a railway car truck, further comprises a manually operable lever-actuated locking mechanism whereby the spring barrel and therefore the one end of the spiral spring, subsequent to a power failure to the torque motor and an application of brakes by the spiral spring as a result of the power failure, can be released from its partially wound-up position. This manually operable locking mechanism for releasing one end of the spiral spring thereby enables an improved, easier and more conveniently effected complete manual brake release operation than is provided by the hand brake mechanism disclosed in the above-mentioned Patent No. 3,217,843.

The manually operated levers of the locking mechanisms of the two brake assemblies located on one side of a four-wheel (that is, two-axle) car truck are connected together through a linkage comprising a system of levers, links, and a latch. The latch is connected to one end of a rod that extends crosswise of the truck and is connected at its other end to a corresponding latch of a corresponding linkage connecting the two brake assemblies on the opposite side of the truck. Each latch is provided with a hexagon for receiving a wrench. Therefore, subsequent to an electric power failure, a wrench may be applied to one of the hexagons and thereafter manually rotated in the proper direction to, through the linkages, operate the lever actuated locking mechanisms of the several brake assemblies to thereby simultaneously completely release the spiral spring forces acting to press the several brake shoes against their respective corresponding wheels in order that the railway car may be moved to a railway shop for repair.

This invention, therefore, comprises a novel package brake assembly for each individual wheel of a railway car truck wherein the brakes are normally maintained released by power means in the form of an electrical torque motor operably connected through a planetary gear train mechanism to a spiral spring for effecting the windup thereof from first the inner end and subsequently the outer end. The torque motor is also operably connected via the planetary gear train mechanism to a screw on which is mounted a traveling nut. This traveling nut has a novel yieldable connection in the form of a cushioned spring means, with a brake lever that is connected by a ball-and-socket joint to a brake rod pivotally connected at one end to a brake-shoe-carrying brake head. The planeary gear train mechanism comprises a releasably locked spring barrel, to which one end of the spiral spring is anchored, in order that the spring barrel can be manually released from its locked position thereby to enable the complete release of the spiral spring brake-applying force upon loss of electrical power to the torque motor.

In the accompanying drawings:

FIG. 1 is a partial vertical cross-sectional view of a brake assembly showing a spring-applied torque motor-released brake linkage together with a clutch mechanism for operating a pair of brake application indicating light switches, and part of a manual brake release mechanism for the brake assembly.

FIG. 2 is a vertical cross-sectional view, taken along the line 2—2 of FIG. 1 and looking in the direction of the arrows, with an end cover shown in FIG. 1 removed to show further structural details.

FIG. 3 is an exploded isometric view of a pair of spring seats for a cushioning spring interposed between a traveling nut and a brake lever.

FIG. 4 is a partial vertical cross-sectional view of a spring windup indicator.

FIG. 5 is a schematic circuit diagram for the torque motors of eight brake assemblies for two four-wheel (that is, two-axle) railway car trucks and a plurality of brake application and brake release indicator lights.

FIG. 6 is a top plan view of a lever mechanism or linkage for effecting a simultaneous manual release of the brakes on a four-wheel (that is, two-axle) car truck, each wheel being provided with the brake assembly shown in FIG. 1.

FIG. 7 is an elevational view of the lever mechanism shown in FIG. 6, as seen from one side of the car truck, and showing the position the respective levers at one side of the truck and their corresponding locking members occupy prior to effecting a manual release of the brakes subsequent to a power failure.

FIG. 8 is an elevational view similar to FIG. 7, but showing the position the respective levers and their corresponding locking members occupy subsequent to effecting a manual release of the brakes on the car truck.

FIG. 11 is a vertical cross-sectional view of part of a modified form of brake assembly embodying a one-way slip clutch interposed between the armature shaft of the torque motor and the sun gear of the planetary gear unit of this brake assembly and constructed in accordance with a third embodiment of the invention.

*Description—FIGS. 1 to 8*

Figure 10:
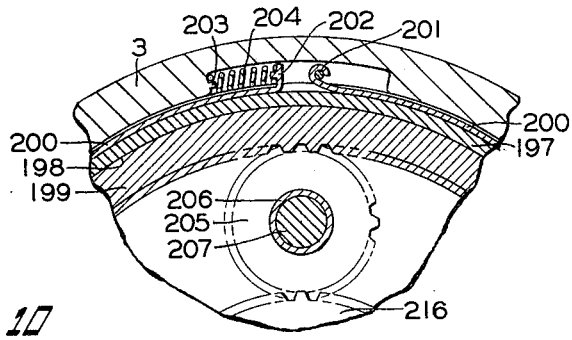
FIG. 10 is a partial cross-sectional view, taken along the line 10—10 of FIG. 9, and looking in the direction of the arrows, showing structural details of a clutch included in the gear train mechanism shown in FIG. 9.

As shown in FIG. 1 of the drawings, each of four brake assemblies associated respectively with the four wheels of one of two car trucks of each railway vehicle comprises a brake head 1 to which a brake shoe (not shown) is secured in the usual manner by a key (not shown), an external brake head hanger or actuating lever 2, and a sectionalized casing or support member comprising a main casing section 3 having formed integral therewith two identical parallel brackets 4, only one of which appears in FIG. 1, connected at their outer ends by a rib 5 that has therein a bore 6 in which is press-fitted a bushing 7 in which is rotatably mounted a pin 8 that extends through the opposite jaws of a clevis 9 formed at the lower end of the actuating lever 2, whereby the actuating lever 2 is pivotally mounted on the two brackets 4. Each of two opposite, parallel, and spaced-apart sides of the casing sections 3 is provided adjacent its lower end with two spaced-apart bores 10 that are coaxial with the corresponding bores in the other side, which bores are for receiving cap screws. Extending upwardly from a top wall 11 of the main casing section 3 are two spaced-apart lugs 12, both of which appear in FIG. 2 of the drawings. Each of the two parallel and spaced-apart lugs 12 is provided with two spaced-apart bores 13, one of which appears in FIG. 1, that are coaxial with the corresponding bores in the other lug. The bores 13 in the lugs 12 and the bores 10 in the casing section 3 are for receiving cap screws, whereby the main casing section 3 may be rigidly secured to a pair of angle brackets (not shown), attached, as by welding, to a pair of pads or mounting lugs (not shown) formed integral with a railway car truck side frame.

Formed in the right-hand side wall of the main casing section 3 is a bore 14 and a coaxial counterbore 15. A rotatable spring barrel 16, open at both ends, is disposed in the counterbore 15, as shown in FIG. 1. The right-hand end of the spring barrel 16 is provided with two coaxial counterbores 17 and 18. Press-fitted into the counterbore 18 is an annular internal gear 19 of a planetary gear unit or train. As shown in FIG. 2 of the drawings, the annular internal gear 19 has a line of contact with three equally arcuately spaced gears 20. Each of the gears 20 is rotatably mounted on a bushing 21 which is press-fitted onto one end of a short shaft 22. The three shafts 22 are equally arcuately spaced, as shown in FIG. 2, and have their respective opposite end press-fitted into a corresponding bore 23, one of which appears in FIG. 1 of the drawings, formed in a spring arbor or planet carrier 24 that, as shown in FIG. 1, is provided with a hub 25 having a bore 26 extending therethrough. As viewed in FIG. 1 of the drawings, the bore 26 has extending inward from its right-hand end a first coaxial counterbore 27 in which is press-fitted a bushing 28 and a second coaxial counterbore 29 larger in diameter than the counterbore 27.

A torque motor 30, only a portion of which appears in FIG. 1, is secured to the right-hand side of the main casing section 3 by a plurality of cap screws 31, two of which appear in FIG. 1, that extend through smooth bores in a flange 32 formed integral with the housing of the torque motor 30 and have screw-threaded engagement with corresponding screw-threaded bores (not shown) formed in the main casing section 3.

The torque motor 30 is provided with an armature shaft 33, the left-hand end of which is rotatably mounted in the bushing 28. As shown in FIG. 1 of the drawings, the armature shaft 33, at the right-hand side of the bushing 28, is provided with a keyway 34 for receiving a key 35. This key 35 extends into a corresponding keyway formed in a bore in a hub 36 that is integral with a sun gear 37 of the hereinbefore mentioned planetary gear train. As can be best seen from FIG. 2, the sun gear 37 has a line of contact with each of the three gears 20.

The right-hand end of a screw 38 having a specially formed concave helical groove 39 is provided with a cylindrical portion 40 of a reduced diameter that, as shown in FIG. 1, extends into the bore 26 in the hub 25. This cylindrical portion 40 and the hub 25 are provided with corresponding keyways in which is disposed a key 41. The key 41 provides a driving connection between the spring arbor 24 and the screw 38.

The left-hand end of the screw 38 is provided with a portion 42 of reduced diameter that is mounted in a self-aligning roller bearing 43 that is carried in a counterbore 44 formed in the left-hand side wall of the main casing section 3 and coaxial with a bore 45 in this side wall through which the portion 42 of reduced diameter of the screw 38 extends. In order to prevent damage by dust and dirt to the self-aligning roller bearing 43, the outer end of the counterbore 44 is closed by a cover member 46 that is secured to the main casing section 3 by a plurality of cap screws 47, two of which appear in FIG. 1 of the drawings.

The outer end of a spiral spring 48 is anchored to the spring barrel 16. The hub 25 carries a radially extending pin, the cross section of the outer end of which is a right triangle. This pin extends through a hole formed adjacent the inner end of the spiral spring 48 and is so disposed that the hypotenuse of the right triangle forming the outer end of the pin is adjacent that end of the hole in the spring that is most remote from the inner end of the spiral spring. This construction provides for the spring arbor 24 to be driven in only a counterclockwise direction by the spiral spring 48, since the remote end of the hole in the spring will ride up the hypotenuse of the right triangle and prevent the spring from driving the spring arbor in a clockwise direction.

Disposed about the reduced portion 40 of the screw 38 and within the spring barrel 16 is a flat annular plate 49, the right-hand side of which abuts the left-hand end of the hub 25. As shown in FIG. 1, the screw 38 has mounted thereon a traveling nut 50, which nut has formed internally a concave helical groove that corresponds to the helical groove 39 formed on the screw 38. A plurality of balls (not shown) are disposed in the groove 39 and the corresponding helical groove in the traveling nut 50. The traveling nut 50 is provided or fitted with a pair of tubular ball guides which interrupt the path of the balls, deflect them from the helical groove 39 and the corresponding groove in the traveling nut 50, guide them diagonally across the outside of the nut 50, and lead them back again into the helical groove 39 in the screw 38 and the corresponding helical groove in the traveling nut 50 at points longitudinally spaced along the screw 38 from the point at which they leave the groove 39 to enter the respective ball guide. This arrangement forms two closed circuits through which the rolling balls, as the medium of engagement between the screw 38 and the traveling nut 50, recirculate continually as the screw 38 and the traveling nut 50 are rotated relative to each other. Thus, the rotary motion of the screw 38 is changed to linear motion of the nut 50 with minimum frictional loss.

It shoud be understood that the screw 38 and the traveling nut 50 may be any suitable commercial type of ball-bearing screw.

As can be seen from FIG. 1, the right-hand end of the traveling nut 50 is provided with external screw threads 51, it being understood that the outer periphery of the traveling nut 50 is cylindrical and has disposed thereabout a lever spring seat 52. This lever spring seat 52 is shown isometrically in FIG. 3 of the drawings and is provided with a pair of diametrically arranged trunnion lugs 53, one of which appears in FIG. 3. As shown in FIG. 3, the lever spring seat 52 has extending from one side thereof a pair of diametrically arranged and arcuately extending ears 54. Formed integral with the pair of ears 54 are a second pair of arcuate ears 55, only one of which appears in FIG. 3 of the drawings, which are shorter in arcuate length than the arcuate ears 54. Formed integral with each of the arcuate ears 55 is a bracket support 56. Midway its length, each of the bracket supports 56 is provided with a U-shaped slot 57, for a purpose hereinafter made apparent. Each bracket support 56 at each end thereof is provided with a boss 58 having extending therethrough a screw-threaded bore 59. The lever spring seat 52 is provided with a central bore 60 which, as can be seen from FIG. 1, is substantially larger in internal diameter than the outside diameter of the traveling nut 50.

As can be seen from FIG. 1, interposed between the right-hand side of the lever spring seat 52 and the left-hand side of a ball nut spring seat 61, having, as shown in FIGS. 1 and 3, a screw-threaded bore 62 that has screw-threaded engagement with the external screw threads 51 of the traveling nut 50, is a spring 63 which is effective to bias the lever spring seat 52 toward the left-hand end of the traveling nut 50. The caged value of this spring 63 may be such as to provide a force which is sufficient to be effective to force or press a brake shoe carried by the brake head 1 against its corresponding wheel to effect the desired degree of braking.

As shown in FIG. 3, the ball nut spring seat 61 is provided with a pair of diametrically arranged trunnion lugs 64. Each of the trunnion lugs 64 is adapted to be received in the corresponding U-shaped slot 57 in one of the bracket supports 56 and a corresponding U-shaped slot 65 formed in one of a pair of yokes 66, shown in FIG. 3 of the drawings. Each of the yokes 66 has formed at each of its ends a boss 67 which is complementary to a corresponding boss 58 formed on one of the bracket supports 56 and provided with a bore 68 in which is received a cap screw (not shown) that has screw-threaded engagement with the screw-threaded bore 59 in the corresponding boss 58. As shown in FIG. 3 of the drawings, the ball nut spring seat 61 has a plurality of spaced-apart arcuate ears 69, only two of which appear in FIG. 3, between which, as shown in FIG. 1, is disposed the right-hand end of the spring 63.

The trunnion lugs 53 of the lever spring seat 52 are respectively straddled by U-shaped openings in legs 70, only one of which appears in FIG. 1 of the drawings, formed on the lower end of a brake lever 71, the upper end of which is pivotally mounted on a bushing 72 through which extends a pin 73. The opposite ends of the pin 73 are carried in coaxial bores in a pair of inwardly facing bosses 74 and 75 (FIG. 2) formed on the opposite side walls of the main casing section 3.

The lever 71 is operatively connected to a brake rod 76 by a ball-and-socket joint (not shown) which is substantially the same as the ball-and-socket joint shown in the hereinbefore-mentioned Patent No. 3,217,843. At its left-hand end, the brake rod 76 is pivotally connected to the brake head 1 and one end of the actuating lever 2 as by means of a bolt 77 and a nut (not shown). The brake head hanger or actuating lever 2 comprises two identical parallel links connected by a web 78 integral therewith so as to form below the web the clevis 9 which, as hereinbefore mentioned, is pivotally connected to the two parallel brackets 4 by the pin 8.

It is apparent from FIG. 1 that as the braking surface of the brake shoe carried by the brake head 1 wears away, the travel of the brake rod 76 in the direction of the left hand will increase progressively with successive applications of the brakes. Therefore, in order to maintain the same travel distance of the brake rod 76 upon each subsequent application of the brakes as the brake shoe wears away, the brake assembly is provided with a slack take-up or adjusting mechanism which may be substantially the same as the slack adjusting mechanism described in the copending application Serial No. 322,103 of George K. Newell, filed November 7, 1963, now abandoned and assigned to the assignee of the present application.

This slack adjusting mechanism comprises a ratchet wheel (not shown), a pawl 79, and a spring-biased pawl-operating linkage 80, shown in FIG. 2 of the drawings, and an arm 81 (FIG. 1) formed integral with the brake lever 71 for operating the linkage 80 to cause the pawl 79 to effect rotation of the ratchet wheel to cause an increase in the length of the brake rod 76 as the brake shoe carried by the brake head 1 wears away.

As shown in FIG. 1, the left-hand end of the brake rod 76 extends through a suitable opening (not shown) in the left-hand wall of the main casing section 3 to the exterior thereof. In order to prevent the entrance of water, ice and dirt to the interior of the main casing section 3, a rubber boot 82 surrounds the opening in the left-hand wall of the casing section 3. The opposite ends of the boot 82 are provided with beads which fit, respectively, around the periphery of the brake rod 76 and in a groove (not shown) formed in an annular plate 83 that is secured to the main casing section 3 as by a plurality of cap screws 84.

The brake assembly of the present invention is further provided with a manual slack adjusting mechanism, the details of which are not shown, which may be substantially the same as that shown and described in the above-mentioned copending application Serial No. 322,103, now abandoned.

In case of a power failure to the torque motor 30, in order to provide for releasing the spring force pressing the brake shoe carried by the brake head 1 against the tread surface of its corresponding wheel, a locking mechanism is provided for locking the spring barrel 16, which locking mechanism, when unlocked, releases the spring force pressing the shoe carried by the brake head against the tread surface of its corresponding wheel. This locking mechanism will now be described.

The outer periphery of the spring barrel 16 is provided with a plurality of arcuately spaced notches or indentations 85, one of which appears in FIG. 2 of the drawings. The spring barrel 16 is normally maintained stationary against rotation by the spiral spring 48 by reason of the lock provided by the lower end of a locking rod 86 which, as shown in FIG. 2, is normally disposed in one of the notches or indentations 85. The locking rod 86 extends through a bore 87 formed in the main casing section 3 and at its upper end is operatively connected, as by means of a pin 88, to a block 89 having a longitudinal bore extending therethrough into the lower end of which is received the upper end of the locking rod 86. The block 89 is also provided with an elongated slot 90. The lower end of a rod 91 extends into the upper end of the longitudinal bore in the block 89 and is operatively connected thereto, as by means of a pin 92 that extends through a bore formed in the lower end of the rod 91 and the elongated slot 90 in the block 89. As shown in FIG. 2 of the drawings, the left-hand end of each of the pins 88 and 92 is provided with a head in the form of a truncated cone. The purpose of providing a truncated cone-shaped head on the left-hand end of the pins 88 and 92 is to provide for operating a switch, hereinafter described in detail. Disposed between the right-hand side of the block 89, as seen in FIG. 2, and the end of each of the pins 88 and 92 is a washer 93 and a cotter pin 94 which prevent removal of these pins by vibration or any other cause.

In order to limit upward movement of the locking rod 86 and the rod 91, a sleeve 95 is disposed about the rod 91 so that its lower end rests against the upper end of the block 89. It will be seen from FIG. 2 of the drawings that the distance between the upper end of the sleeve 95 and the bottom surface of the top wall 11 of the main casing section 3 limits the amount the rod 91 can move in an upward direction. A spring 96 is disposed about the sleeve 95 and interposed between the top of the block 89 and the bottom surface of the top wall 11 to normally bias the rod 91, the block 89, and the locking rod 86 downward to the spring barrel locking position, in which they are shown in FIG 2 of the drawings.

The rod 91 extends through a bore 97 in the top wall 11 of the main casing section 3 and has its upper end disposed between the jaws of a clevis 98 formed at one end of a short link 99. The rod 91 is operatively connected to the clevis 98 by a pin 100 that extends through a bore in the rod 91 and has its opposite ends anchored in corresponding bores in the opposite jaws of the clevis. The upper end of the short link 99 has a portion 101 of reduced thickness which is disposed between the opposite jaws of a clevis 102 formed at the end of an arm 103 (FIG. 1) of a manual release lever 104 and operatively connected to the clevis 102 by a pin 105.

One end of the manual release level 104, as shown in FIG. 1, is provided with a bore 106 through which extends one of a pair of cap screws 107 that also extend through the coaxial bores 13 formed in the two parallel spaced-apart lugs 12, shown in FIG. 2, between which lugs the one end of the lever 104 is disposed. This pair of cap screws, together with a second pair of cap screws 107 which extend respectively through the two bores 10 in the two opposite parallel sides of the casing section 3, serve to secure the casing section 3 to the hereinbefore-mentioned angle brackets which are secured to the pads or mounting lugs that are formed integral with the truck side frame.

Each four-wheel (that is, two-axle) truck of a railway car is provided with four brake assemblies, constructed as shown in FIGS. 1 and 2 of the drawings, one brake assembly for each wheel of the truck.

Referring to FIG. 6 of the drawings, it will be seen that the manual release levers 104 of the two brake assemblies located on each side of the four-wheel (that is, two-axle car truck are connected together through a linkage which will now be described. Each of the two manual release levers 104 of each of the two linkages, one on each side of the truck, has at the end thereof opposite the arm 103 a clevis 108, between the jaws of which is disposed one end of a link 109 which comprises two rods 110 and 111, the adjacent ends of which are screw threaded and connected by means of a turnbuckle 112 that is shown in FIGS. 7 and 8 of the drawings. The turnbuckle 112 provides for initially adjusting the length of the link 109.

Referring again to FIG. 6, it will be seen that the left-hand end of each rod 110 is provided with a portion 113 of reduced diameter which is disposed between the jaws of the clevis 108 at the end of the corresponding manual release lever 104 opposite the arm 103. As can be seen from FIG. 6 of the drawings, the portion of reduced diameter 113 of each rod 110 is operatively connected to a corresponding latch 114 as by means of a pin 115 that extends through a bore in the portion 113 of reduced diameter and has its opposite ends anchored in the jaws of a clevis 116 that is formed integral with the latch 114, one end of the jaws of the clevis 116 being integrally connected by a web 116a, the construction of which is apparent from FIGS. 6, 7 and 8. As can best be seen from FIG. 6, each latch 114 has formed integral therewith two spaced-apart and coaxial hubs 117 and 118 which are in the form of a hexagon for receiving a wrench by which the respective latch 114 can be rotated for effecting a manual release of the brakes on the car truck, in the manner hereinafter described in detail. The hub 118 of the lower latch 114 and the hub 117 of the upper latch 114, shown in FIG. 6, are respectively provided with a bore 119, in each of which bores 119 is disposed a short shaft 120 that is anchored to the respective hubs 118 and 117 as by a pin 121. As viewed in FIG. 6 of the drawings, the shafts 120 each have at one end a portion of reduced diameter which is disposed in a bore formed in one jaw of the respective clevis 108, it being understood that the diameter of the bore is such as to provide a turning fit therein for the one end of the short shaft 120.

A rod 122 extends crosswise of the truck and is connected at its opposite ends to the two latches 114 shown in FIG. 6. As can also be seen from FIG. 6, the other jaw of each clevis 108 is provided with a bore for receiving a portion of reduced diameter formed at the corresponding end of the rod 122. That portion of the rod 122 adjacent this portion of reduced diameter extends through a bore 123 formed in the respective hubs 118 and 117 and is secured to the corresponding hub by a pin 124.

As shown in FIG. 6, the right-hand end of the rod 111 of each of the two links 109 on the respective opposite sides of the truck is provided with a milled end portion 125 which is disposed between the opposite jaws of the corresponding clevis 108 of a manual release lever 104 and operatively connected thereto by means of a headed pin 126 and a cotter pin 127.

Each brake assembly is provided with a spring windup indicator for indicating the number of complete revolutions made by the spring barrel 16 when winding up the spiral spring 48 from a release position to a completely wound position.

As shown in FIG. 1 of the drawings, the outer periphery of the spring barrel 16 is provided with a helical thread 128 which constitutes a worm which meshes with a worm wheel 129, shown in FIG. 4. Formed on the left-hand side of the worm wheel 129, as viewed in FIG. 4, is a hub 130 on the periphery of which are equally spaced the numerals 0 to 9. The construction of the worm and worm wheel is such that two complete revolutions of the spring barrel 16 will effect rotation of the worm wheel 129 and hub 130 through an arc of such length that each one of the numerals on the hub will be rotated to the position previously occupied by an adjacent numeral, or, in other words, through an arc equal to the arcuate distance between two adjacent numerals on the hub 130.

The hub 130 and worm wheel 129 have a bore extending therethrough whereby the worm wheel may be press-fitted onto a shaft 131. As shown in FIG. 4 of the drawings, the left-hand end of the shaft 131 rests against a knife edge or shoulder 132 formed by a bore 133 and a coaxial counterbore 134 in the casing section 3. The casing section 3 is also provided with a second counterbore 135 that is coaxial with the bore 133. Disposed in the counterbore 135 is a cover member 136 that is secured to the casing member 3 by means of a pair of cap screws 137. As shown in FIG. 4, the right-hand end of the shaft 131 is biased against the cover member 136 by a spring 137a interposed between the end of the shaft and the casing section 3. The cover member 136 is provided with a counterbore 138 in which is disposed two snap rings 139 between which is interposed a transparent glass disc 140 through which may be observed rotation of the worm wheel 129 and hub 130 whereby the number of rotations of the worm wheel and, therefore, the spring barrel 16 necessary to effect windup of the spiral spring 48, in the manner hereinafter described in detail, can be noted.

A railway car, each of the eight wheels of which is provided with a novel brake assembly of the present invention, is also provided with three colored indicating lamps, two of which are located exteriorly of the car on each side of the back end thereof. The third colored indicating lamp is located within the car adjacent the front end thereof in a position in which it may be readily observed by the engineer. These indicating lamps are connected in an electrical circuit in parallel with the torque motors of the eight brake assemblies. Three single-pole, double-throw microswitches, each having a single contact, are associated with each of these brake assemblies and are operated thereby to control energization and deenergization of the indicating lamps, in a manner now to be explained.

The electrical circuit including the colored indicating lamps, the respective contact of each of the microswitches and the torque motors, together with a source of electrical power supply and a remote controlled motor-operated rheostat, is shown diagrammatically in FIG. 5 of the drawings. Since the three microswitches associated with each brake assembly are identical, only one set of these switches is shown in detail in FIG. 5.

As shown in FIG. 5 of the drawings, a source of electrical power, which may be, for example, a motor generator set and a parallel connected storage battery, generally indicated as a battery 141, has its positive terminal connected by a wire 142 to one end of a resistance element 143 of a remote controlled motor operated rheostat 144 that is provided with a movable arm 145 mounted on one end of an armature shaft 146 of an electrical motor 146a, the operation of which is remotely controlled by the engineer of the train. The movable arm 145 is connected through suitable brushes to one end of a wire 147 that has its opposite end connected to one terminal of a single contact manually operated cutout switch 148 which is under the manual control of the engineer. Connected to the other terminal of the single contact manually operated cutout switch 148 is one end of a power supply wire 149 having one end of each of four branch wires 149a connected thereto. Connected to the other end of each of the branch wires 149a is one end of each of two branch wires 149b. The other end of each of the branch wires 149b is connected to the positive terminal of a corresponding one of the torque motors 30. The negative terminal of each of the torque motors 30 is connected by a branch wire 150a to a common return wire 150 that is connected to the negative terminal of the source of electrical power 141.

Located within the car adjacent the front end thereof in a position in which it is plainly visible to the engineer is a colored indicating lamp 151, one terminal of which is connected by a wire 152 to one terminal of a single contact manually operated cutout switch 153 also under the manual control of the engineer. Connected to the other terminal of the cutout switch 153 is one end of a wire 154 that has its opposite end connected to the wire 142 between the positive terminal of the source of electrical power 141 and the resistance element 143.

Connected to the other terminal of the indicating lamp 151 is one end of a wire 155 that has one end of each of four branch wires 155a connected thereto. Connected to the other end of each of the branch wires 155a is one end of each of two branch wires 155b. The other end of each of the branch wires 155b is connected to one terminal of a corresponding single-pole, double-throw microswitch device 156, shown in FIG. 1 of the drawings and operated in a manner hereinafter described. The microswitch device 156 is provided with a single movable contact, indicated in FIG. 5 by the reference numeral 157, which contact, in its closed position in which it is shown in FIG. 5, completes a circuit from the corresponding branch wire 155b connected to the one terminal of the microswitch device 156 to a wire 158 (FIG. 5), one end of which is connected to another terminal of this microswitch device. The other end of each wire 158 is connected to one terminal of a second corresponding single-throw, double-pole microswitch device 159, shown in FIG. 2 of the drawings.

The microswitch device 159 is identical in construction to the microswitch device 156 and, therefore, is provided with a single movable contact indicated in FIG. 5 by the reference numeral 160. While the contact 160 occupies the position in which it is shown in FIG. 5, it completes a circuit from the corresponding wire 158 connected to one terminal of the microswitch device 159 to a wire 161 (FIG. 5), one end of which is connected to a second terminal of the microswitch device 159. The other end of the wire 161 is connected to the hereinbefore mentioned branch wire 150a.

Connected to the third terminal of each of the single-throw double-pole microswitch devices 159 is one end of a wire 162, the opposite end of which is connected to one terminal of a third corresponding single-pole double-throw microswitch device 163, shown in FIG. 1 of the drawings. As shown in FIG. 1, the microswitch device 163 is arranged in a stack with or is disposed on top of the microswitch device 156 and is operated simultaneously therewith in a manner hereinafter described. The microswitch device 163 is provided with a single movable contact indicated in FIG. 5 by the reference numeral 164. While the contact 164 occupies the position in which it is shown in FIG. 5, it completes a circuit from the corresponding wire 162 connected to the one terminal of the microswitch device 163 to a wire 165 (FIG. 5), one end of which is connected to another terminal of the microswitch device 163. The other end of the wire 165 is connected to the hereinbefore mentioned branch wire 150a.

Also connected to the one terminal of each microswitch device 163 is one end of a branch wire 166a. The other end of each of the two branch wires 166a of the two brake assemblies associated with the pair of wheels on each side of each of the car trucks is connected to one end of a corresponding branch wire 166b. The other end of each of the branch wires 166b is connected to a wire 166 that is connected to one terminal of each of two parallel connected colored indicating lamps 167 and 168 located exteriorly of the car on each side of the back end thereof.

Connected to the other terminal of the respective colored indicating lamps 167 and 168 is a branch of a wire 169 that is connected to the hereinbefore mentioned wire 152.

As shown in FIG. 1 of the drawings, the two single-pole double-throw microswitch devices 156 and 163 are arranged in a stack and secured to a switch and terminal mount 170 that abuts the bottom surface of the top wall 11 of the main casing section 3 and is secured thereto by a plurality of cap screws 171, the head of one of which appears in FIG. 1.

The single-throw double-pole microswitch device 159 is also secured to the switch and terminal mount 170 by a pair of cap screws 172, as shown in FIGS. 1 and 2 of the drawings.

Each of the three microswitch devices 156, 159 and 163 is provided with a contact actuating plunger 173 for actuating the single contact of the corresponding microswitch device.

As shown in FIG. 1, the contact actuating plungers 173 of the microswitch devices 156 and 163 are adapted to be simultaneously actuated by a flexible actuating plate 174 that is provided with an arm having therein two spaced-apart bores (not shown) that are in alignment with a pair of corresponding bores (not shown) in each of the microswitch devices 156 and 163 whereby the actuating plate 174 and the two microswitch devices 156 and 163 arranged in a stack are secured to the switch and terminal mount 170 by a pair of cap screws 175.

The actuating plate 174 is adapted to be flexed in the direction of the microswitch devices 156 and 163 to actuate their respective actuating plungers 173 by a collar 176 (FIG. 1) formed integral with the right-hand end of a rod 177 that slidably extends through a bore (not shown) in the switch and terminal mount 170.

The rod 177 is connected to a link 178 through a friction clutch comprising a split element 179 having a truncated cone formed at its right-hand end. Each half of the split element 179 is provided with a semicircular recess, the radius of which is equal to substantially one-half the diameter of the rod 177. The two halves of the split element 179 are slidably mounted in a first counterbore 180 formed in the right-hand end of the link 178 and disposed in surrounding relation to the rod 177. The right-hand end of the counterbore 180 is screw threaded to receive a hollow screw-threaded plug 181 through which the rod 177 slidably extends. The threaded end of the plug 181 is provided with a cone-shaped recess into which is biased the truncated cone formed on the right-hand end of the split element 179 by a spring 182 disposed in surrounding relation to the rod 177 and interposed between the left-hand end of the split element 179 and a shoulder formed by the end of the first counterbore 180 that is coaxial with a second counterbore 183 of smaller diameter formed in the link 178 into which second counterbore the left-hand end of the rod 177 extends.

The left-hand end of the link 178 is provided with a clevis 184 between the jaws of which is received a square head formed on the upper end of a short bolt 185 that is screw threaded into a screw-threaded bore 186 formed in the hub portion of the brake lever 71. The square head of the short bolt 185 is pivotally connected to the clevis 184 as by means of a pin 187, whereby clockwise rocking of the brake lever 71 about the bushing 72 mounted on the pin 73 effects movement of the link 178 in the direction of the right hand, as viewed in FIG. 1, to cause operation of the micro-switch devices 156 and 163, in a manner hereinafter described in detail.

The hereinbefore-mentioned cap screws 172, which secure the microswitch device 159 to the switch and terminal mount 170, extend through two spaced-apart bores (not shown) in an angle bracket 188 (FIG. 2). The angle bracket 188 is provided with an integral clevis 189 upon which, by means such as a pin 190, a lever or actuator 191 is rockably mounted intermediate the ends thereof. As shown in FIG. 2, the upper end of the lever 191 is provided with a clevis in the opposite jaws of which is anchored the opposite ends of a pin 192 upon which is rotatably mounted a roller 193 which, while the lever 191 occupies the position shown in FIG. 2, is disposed in the path of movement of the truncated head provided on the left-hand end of the pin 92. Therefore, when the pin 92 and rod 91 are manually moved upward to effect a manual release of brakes, these elements are, through the intermediary of the block 89 and pin 88, effective to move the lower end of the locking rod 86 upward out of the notch 85 in the spring barrel 16, and the truncated head provided on the left-hand end of the pin 92 is effective to contact the roller 193 to effect counterclockwise rocking of the lever 191 about the pin 190 until the lever 191 strikes the contact actuating plunger 173 of the microswitch device 159. Continued counterclockwise rocking of the lever 191 about the pin 190 is effective to move the contact actuating plunger 173 in the direction of the left hand to actuate the movable conact 160 (FIG. 5) from the position in which it is shown in FIG. 5 of the drawings to another or a second position in which it opens the circuit between the corresponding wires 158 and 161 each of which at one end is connected, respectively, to one of the three terminals of the microswitch device 159. When the movable contact 160 is thus moved to its second position, it is effective to establish a circuit between the wires 161, which is connected at its other end to the branch wire 150a and the wire 162 which is connected at one end to the third terminal of the microswitch device 159. This movement of the movable contact 160 of the microswitch device 159 from the position in which it is shown in FIG. 5 in response to effecting a manual release of the brakes is effective to open the circuit of the colored indicating lamp 151 to cause its extinguishment. When the colored indicating lamp 151 is thus extinguished, the engineer will be apprised of the fact that a manual release of the spring-applied brake has been effected.

Operation—FIGS. 1 to 8

When the torque motor 30 (FIGS. 1 and 5) of each brake assembly is supplied with current through its respective power supply circuit, this torque motor is rendered effective to rotate its armature shaft 33 (FIG. 1). The power supply circuit for the torque motor 30, shown in FIG. 5, extends from the positive terminal of the source of electrical power 141 via the wire 142, resistance element 143 and arm 145 of the remote-controlled motor-operated rheostat 144, wire 147, switch 148, which it will be assumed has been moved to its closed position by the engineer at the time he took control of the train, power supply wire 149 and branch wires 149a and 149b to the positive terminal of the motor 30, thence through the field coil and armature of this motor, branch wire 150a, and common return wire 150 to the negative terminal of the source of electrical power 141. It will be understood that the torque motor 30 of each of the eight brake assemblies on the car is simultaneously supplied with current through a circuit corresponding to that described above. Therefore, each of the eight torque motors is rendered effective to rotate its corresponding armature shaft 33. Since the operation of each brake assembly by its corresponding torque motor is the same, the operation of only one brake assembly will be described in detail.

Let it be assumed that when each brake assembly is initially assembled, the corresponding brake lever 71, traveling nut 50 and ball nut spring seat 61 occupy the release position in which they are shown in FIG. 1, in which the ball nut spring seat 61 abuts the left-hand side of the flat annular plate 49, the spiral spring 48 is completely unwound, and the lower end of the locking rod 86 is not disposed in any of the indentations 85 in the outer periphery of the spring barrel 16 but has been moved in a manner hereinafter described in detail to a position in which it will be slightly above the outer periphery of the spring barrel 16 so that the spring barrel can rotate without interference by the locking rod 86.

The armature shaft 33 (FIG. 1) of each torque motor 30 is connected to the hub 36 of the corresponding sun gear 37 by means of the key 35. Therefore, upon the supply of current to each torque motor 30, it will be assumed that the corresponding armature shaft 33 rotates the sun gear 37 clockwise, as viewed in FIG. 2 of the drawings. This clockwise rotation of the sun gear 37 is effective to cause counterclockwise rotation of the three gears 20 about their respective bushings 21, each of which is press-fitted onto one end of a corresponding short shaft 22 carried by the spring arbor 24. The hub 25 of the spring arbor 24 is connected to the cylindrical portion 40 of the screw 38 by the key 41. Since the spring seat 61 that has screw-threaded engagement with the right-hand end of the traveling nut 50 abuts the left-hand side of the flat annular plate 49, the traveling nut 50 cannot travel further in the direction of the right hand. Therefore, the screw 38 and spring arbor 24 cannot rotate in the direction to move the traveling nut 50 in the direction of the right hand, as viewed in FIG. 1. Since the spring arbor 24 cannot rotate in the direction to move the traveling nut 50 in the direction of the right hand, the abovementioned counterclockwise rotation of the three gears 20 about their respective bushings 21 is effective to cause the annular internal gear 19 and the spring barrel 16 to rotate counterclockwise, as viewed in FIG. 2. Since the outer end of the spiral spring 48 is anchored to the spring barrel 16, this counterclockwise rotation of the spring barrel 16 and annular internal gear 19 carried thereby will effect windup of the spiral spring 48. Consequently, the continued counterclockwise rotation of the spring barrel 16 and annular internal gear 19 will effect a complete windup of the left-hand wound spiral spring 48.

Subsequent to the complete windup of the spiral spring 48 of each of the eight brake assemblies on the two-truck car, the locking rod 86 of each brake assembly is moved downward, in a manner hereinafter described, until the lower end thereof contacts the periphery of the corresponding spring barrel 16, it being understood that the spring barrel 16 may or may not be in such a position that one of the indentations 85 thereon will be in alignment with the locking rod 86 so that the lower end of the locking rod may be received therein.

Since the spring barrel 16 of one or more of the eight brake assemblies may not be in such an angular position that an indentation 85 on the periphery thereof is in alignment with the lower end of the corresponding locking rod 86, the amount of electric current supplied to the eight torque motors 30 should be decreased slightly, in a manner hereinafter described, to cause the corresponding spiral spring 48 of the one or more brake assemblies to slightly unwind and threby cause clockwise rotation of the spring barrel 16 of these brake assemblies until one of the indentations 85 on its periphery is in alignment with the lower end of the corresponding locking rod 86 whereupon the spring 96 will force the lower end of this locking rod 86 into the indentation 85 that is in alignment therewith to thereby lock the corresponding spring barrel 16 against rotation.

It may be noted that the initial potential energy in the spiral springs 48 may be varied as desired accordingly as these springs are completely wound up or are wound up to a chosen degree less than a complete windup, in proportion to the amount of current supplied to the corresponding torque motors 30, it being understood that the spring barrels 16 are locked in the manner described above subsequent to the spiral springs 48 being wound up to the desired degree.

In operation, when it is desired to effect a light brake application, the engineer will, through remote control means (not shown), effect energization of the electric motor 146a (FIG. 5) to cause counterclockwise rotation of the shaft 146 and movable arm 145 of the remote controlled motor-operated rheostat 144 to increase the amount of the resistance 143 in the power supply circuit to the torque motor 30 of each of the eight brake assemblies provided for the respective eight wheels on the two-truck car.

As the amount of the resistance 143 in the power supply circuit to the eight torque motors 30 is increased, the energizing current supplied to these torque motors is correspondingly reduced to cause a corresponding reduction in the output torque of these motors. Consequently, upon this reduction in the output torque of the torque motor 30 shown in FIG. 1, there is insufficient force to maintain the corresponding spiral spring 48 in its completely wound position. Therefore, when the output torque of the torque motor 30 is reduced in the manner just explained, the corresponding spiral spring 48 unwinds partially to release the stored energy in the spring until the remaining stored energy in the spring balances the reduced output torque of the torque motor 30. As the spiral spring 48 unwinds to release the stored energy therein, this spiral spring effects counterclockwise rotation, as viewed in FIG. 2, of the hub 25 and spring arbor 24 since the inner end of the spiral spring 48 is anchored to the hub 25. As the spring arbor 24 is thus rotated counterclockwise, the three short shafts 22 anchored therein are carried therewith. Since the internal gear 19 is fixed or locked, the three gears 20 are therefore rotated clockwise on their respective bushings 21 and roll counterclockwise about the inside of the annular internal gear 19 as the spring arbor 24 is rotated counterclockwise by the unwinding of the spiral spring 48. As the three gears 20 are thus rotated clockwise on the respective bushings 21 by the unwinding of the spiral spring 48, they are effective to cause the sun gear 37 to rotate counterclockwise. Since the sun gear 37 is keyed to the armature shaft 33 by the key 35, the armature shaft 33 of the torque motor 30 is likewise rotated counterclockwise. The armature shaft 33 of the torque motor is thus rotated counterclockwise until the remaining stored energy in the spiral spring 48 balances the reduced output torque of the torque motor 30, it being understood that the reduction in the stored energy in the spiral spring 48 is the force now pressing the brake shoe against the tread surface of the corresponding wheel, this force being transmitted to the brake shoe, in the manner now to be explained.

The hub 25 of the spring arbor 24 is connected or keyed to the cylindrical portion 40 of the screw 38 by the key 41 (FIG. 1), as hereinbefore explained. Therefore, counterclockwise rotation of the spring arbor 24, as viewed in FIG. 2, is effective to rotate the screw 38 therewith in the self-aligning roller bearing 43, shown in FIG. 1. This rotation of the screw 38 by the spiral spring 48 (via the spring arbor 24) is effective to cause the traveling nut 50 to travel along the screw 38 in the direction of the left hand, as viewed in FIG. 1, since the lower end of the brake lever 71 is connected to the traveling nut 50 to prevent turning thereof, as will now be explained in detail.

The traveling nut 50 is restrained from rotation by the brake lever 71 since the U-shaped openings in the legs 70 at the lower forked end of this brake lever straddle the trunnion lugs 53 of the lever spring seat 52. Seat 52 is disposed in surrounding relation to the nut 50 and supports one end of the heavy spring 63, the opposite end of which rests against the ball nut spring seat 61. Spring seat 61 is carried on the traveling nut 50 in screw-threaded engagement therewith and is operatively connected by a lost-motion connection to the spring seat 52. This lost-motion connection includes the two trunnion lugs 64 (FIG. 3) that are integral with the spring seat 61 and respectively disposed in corresponding elongated slots formed by the oppositely extending U-shaped slots 57 and 65 formed respectively in corresponding bracket supports 56 that are integral with the spring seat 52 and yokes 66 connected to the bracket supports 56 by cap screws. Therefore, the traveling nut 50 will travel along the screw 38 in the direction of the left hand, as viewed in FIG. 1, as the screw 38 is driven by the spiral spring 48 through spring arbor 24 to cause the brake lever 71 to rock clockwise about the bushing 72 carried by the pin 73. Since the brake lever 71 in the brake assembly is pivotally connected to the brake rod 76 by means of a ball or universal joint (not shown), this clockwise rocking of the brake lever 71 is effective to move the brake rod 76 in the direction of the left hand (FIG. 1) to bring the brake shoe carried by the brake head 1 into braking contact with the tread surface of the corresponding wheel of effect a braking action on this wheel.

As the brake lever 71 is rocked clockwise in the manner just explained, the short bolt 185 (FIG. 1) carried thereby, by reason of its pivotal connection with the link 178 via the clevis 184 and pin 187, is effective to shift the link 178 in the direction of the right hand. As the link 178 is thus shifted in the direction of the right hand, the rod 177 is carried therewith until the collar 176 formed on the right-hand end of the rod 177 is moved into contact with the left-hand side of the flexible actuating plate 174. Continued shifting of the link 178, rod 177 and collar 176 in the direction of the right hand is effective to flex the actuating plate 174 to cause it to move in the direction of the right hand, as viewed in FIG. 1, and thereby simultaneously move the respective actuating plungers 173 of the microswitch devices 156 and 163 in the same direction. This movement of the actuating plunger 173 of the micro-switch device 156 is effective to move the single movable contact 157 of this microswitch device 156 to the closed position, in which it is shown in FIG. 5, to establish a circuit for energizing the colored indicating lamp 151 thereby to appraise the engineer of the fact that the brakes are applied.

The circuit for energizing the colored indicating lamp 151 extends from the positive terminal of the source of electrical power 141 via wires 142, wire 154, cutout switch 153 which is now closed, and wire 152 to one terminal of the indicating lamp 151, thence via the other terminal of indicating lamp 151, wire 155, branch wires 155a and 155b, movable contact 157 of the microswitch device 156, which contact 157 now occupies the position in which it is shown in FIG. 5, wire 158, contact 160 of the microswitch device 159, which contact 160 now occupies the position in which it is shown in FIG. 5 for the reason hereinafter explained, wire 161, branch wire 150a and common return wire 150 to the negative terminal of the source of electrical power 141.

The movement of the actuating plunger 173 of the microswitch 163 by the flexing of the actuating plate 174 is effective to move the single movable contact 164 of this micro-switch to the closed position, in which it is shown in FIG. 5, to establish a circuit for energizing the two parallel-connected colored indicating lamps 167 and 168 located exteriorly of the car on each side of the back end thereof.

The circuit for energizing the colored indicating lamps 167 and 168 extends from the positive terminal of the source of electrical power 141 via wires 142 and 154, cutout switch 153 which is now closed, wire 152, and wire 169 to one terminal of each of the indicating lamps 167 and 168, thence via the other terminal of each of these indicating lamps, wire 166, branch wires 166b and 166a, movable contact 164 of the micro-switch device 163, which contact 164 now occupies the closed position, in which it is shown in FIG. 5, wire 165, branch wire 150a and common return wire 150 to the negative terminal of the source of electrical power 141.

Establishment of the circuit for energizing the colored indicating lamps 167 and 168 renders these indicating lamps effective to apprise a person exterior of the car, for example, the engineer of a following train or a trainman assigned to the task of effecting a manual release of the brakes on the car, that the brake assembly associated with at least one wheel of the car is in its brake-applied position.

It may be noted that subsequent to the collar 176 (FIG. 1), flexing the actuating plate 174 sufficiently to simultaneously operate the microswitches 156 and 163 via their respective actuating plungers 173, the split element 179 (FIG. 1) of the friction clutch, which is biased into gripping contact with the periphery of the rod 177 by the spring 182, slides along the rod 177 as the link 178 is shifted further in the direction of the right hand in response to the additional clockwise rocking of the brake lever 71 necessary to bring the brake shoe carried by the brake head 1 into braking contact with the tread surface of the corresponding wheel. Therefore, the circuits of the colored indicating lamps 151, 167 and 168 are energized in response to the initial clockwise rocking of the brake lever 71 through a comparatively small angle.

When it is desired to effect a release of the light brake application, the engineer will, through the remote control means, effect energization of the electric motor 146a (FIG. 5) to cause clockwise rotation of the shaft 146 and movable arm 145 of the remote controlled motor operated rheostat 144 to decrease the amount of the resistance 143 in the power supply circuit to the torque motor 30 of each of the eight brake assemblies provided for the eight wheels on the two-truck car.

As the amount of the resistance 143 in the power supply circuit to the eight torque motors 30 is decreased, the energizing current supplied to these motors is correspondingly increased thereby effecting a restoration of the energization of the torque motors 30 until these motors are supplied with maximum current whereupon the torque output of each torque motor 30 will increase to its maximum value. Consequently, the torque motor 30, shown in FIG. 1, will now, through its armature shaft 33, the key 35, and hub 36 of sun gear 37, rotate the sun gear 37 clockwise, as viewed in FIG. 2. This clockwise rotation of the sun gear 37 is effective to cause counterclockwise rotation of the three gears 20 about their respective bushings 21, each of which is press-fitted onto one end of a corresponding short shaft 22 carried by the spring arbor 24. Since the annular internal gear 19 is press-fitted into the counterbore 18 (FIG. 1) formed in the spring barrel 16 which is now locked against rotation by the locking rod 86, this internal gear is also locked against rotation. Therefore, the three gears 20 will roll clockwise around the inside of the internal gear 19 as each rotates counterclockwise on its corresponding bushing 21. As the three gears 20 thus rotate or roll clockwise around the inside of the internal gear 19, the spring arbor 24 is rotated clockwise, as viewed in FIG. 2, since the three bushings 21, on which the three gears 20 are rotatably mounted, are press-fitted onto one end of the three corresponding shafts 22, each of which has its respective opposite end pressfitted into a corresponding bore 23 (FIG. 1) formed in the spring arbor 24.

As can be seen in FIG. 1 of the drawings, the spring arbor 24 has formed integral therewith the hub 25 having therein the bore 26 into which is received the cylindrical portion 40 formed on the right-hand end of the screw 38, the screw 38 being operatively connected to the hub 25 by the key 41 disposed in corresponding keyways formed in the cylindrical portion 40 and hub 25. Therefore, the spring arbor 24 rotates or drives the screw 38 in a corresponding direction.

Since the traveling nut 50 is restrained from rotation in the manner hereinbefore explained in detail, this nut 50 will travel along the screw 38 in the direction of the right hand, as viewed in FIG. 1, until the spring seat 61 contacts the left-hand side of the flat annular plate 49. As the traveling nut 50 thus moves along the screw, it is effective to rock the brake lever 71 in a counterclockwise direction to its brake release position, it being noted that movement of the traveling nut 50 is transmitted through the spring seats 52 and 61 and spring 63 to the lever 71.

Since the spring seat 61 now abuts the flat annular plate 49, the traveling nut 50 cannot travel along the screw 38 any further in the direction of the right hand. Consequently, the torque motor 30 is stalled in the brake release position of the brake lever 71.

It should be understood that each torque motor 30 is provided with sufficient heat radiation capacity that it may remain in a stalled condition for an indefinite period of time in which the brakes are released without overheating the torque motor.

As the brake lever 71 is thus rocked in a counterclockwise direction toward its release position, the short bolt 185 (FIG. 1) carried by the hub of the brake lever 71 and pivotally connected by the pin 187 to the clevis 184 of the link is effective to shift the link 178 in the direction of the left hand, as viewed in FIG. 1. As the link 178 is thus shifted in the direction of the left hand, by reason of the fact that the spring 182 is effective to bias the split element 179 into gripping contact with the periphery of the rod 177, the rod 177 will be shifted in the direction of the left hand along with the link 178, thus moving the collar 176 on the righthand end of the rod 177 away from the flexible actuating plate 174, whereupon the actuating plate 174 is allowed to flex in a direction away from the actuating plungers 173 of the respective micro-switch devices 156 and 163.

The contacts 157 and 164 (FIG. 5) of the respective microswitch devices 156 and 163 are in the form of leaf springs which are flexed or bent when moved by the corresponding actuating plungers 173 to their closed positions, in which they are shown in FIG. 5. Therefore, when the collar 176 is moved in the direction of the left hand, as viewed in FIG. 1, away from the actuating plate 174, thereby allowing this plate to flex in a direction away from the actuating plungers 173 of the respective microswitch devices 156 and 163, the corresponding contacts 157 and 164 of these microswitch devices are allowed to flex or straighten out and thereby move from their closed position, in which they are shown in FIG. 5, to a second or open position. The contact 157 of the microswitch device 156, as it moves from its closed to its open position, breaks the circuit between the branch wire 155b and the wire 158, thereby opening the power supply circuit to the colored indicating lamp 151 which is thus extinguished to apprise the engineer of the fact that the brakes are now released.

Likewise, the contact 164 of the microswitch device 163, as it moves from its closed to its open position, breaks the circuit between the branch wire 166a and the wire 165, thereby opening the power supply circuit to the colored indicating lamps 167 and 168 which are thus extinguished to apprise anyone in view of the back end of the car of the fact that the brakes are now released.

Since the inner end of the spiral spring 48 is anchored to the hub 25 of the spring arbor 24, the abovementioned clockwise rotation of the spring arbor 24 by the torque motor 30 is effective to wind up the spiral spring 48 until it is completely wound. The brakes will now remain released as long as the eight torque motors are supplied with maximum current.

Now, let it be supposed that while the brakes are released the engineer desired to effect a heavier brake application than was effected in the manner previously described. To do so, he will, through the hereinbeforementioned remote control means, effect energization of the electric motor 146a (FIG. 5) to cause counterclockwise rotation of the shaft 146 and movable arm 145 of the remote controlled motor operated rheostat 144 to increase the amount of the resistance 143 in the power supply circuit to the torque motor 30 of each of the eight brake assemblies provided for the corresponding eight wheels on the two-truck car to effect a greater reduction of the degree of energizing current supplied to the torque motors 30 than when the above-described light brake application was effected to cause a greater reduction in the output torque of the torque motors 30. When the output torque of each of the eight torque motors 30 is thus reduced, the output torque of each torque motor is insufficient to maintain its corresponding spiral spring 48 in its completely wound position. Therefore, when the torque output of each torque motor 30 is reduced in the manner just explained, the corresponding spiral spring 48 unwinds to release the stored energy in the spring until the remaining stored energy balances the output torque of the corresponding torque motor 30. As each spiral spring 48 unwinds to release the stored energy therein, this spiral spring effects rotation of the corresponding screw 38, in the manner hereinbefore described, to cause movement of the corresponding traveling nut 50 therealong in the direction of the left hand, as viewed in FIG. 1, to effect corresponding clockwise rocking of the brake lever 71 to cause an application of brakes, in the manner hereinbefore described. It should be noted that a greater braking force is applied to each wheel than was applied when effecting the light brake application previously described, since the output torque of each torque motor 30 is reduced more than it was when the light brake application was effected.

When it is desired to release this moderately heavy brake application, the engineer effects a restoration of energization of the torque motors 30, in the manner hereinbefore explained in detail, until these motors are supplied with maximum current, whereupon the corresponding brake shoes carried by each respective brake head 1 will be moved away from its corresponding wheel, in the manner hereinbefore described in connection with effecting the release of the brakes after a light brake application.

It should be understood that upon effecting this heavier brake application and its subsequent release, the microswitch devices 156 and 163 and the colored indicating lamps 151, 167 and 168 operate in the manner hereinbefore described, and, therefore, need not be repeated in detail.

Let it now be supposed that the engineer desires to effect a full brake application. To effect a full brake application, the engineer, through the hereinbeforementioned remote control means, effects energization of the electric motor 146a (FIG. 5) to cause counterclockwise rotation of the shaft 146 and movable arm 145 of the remote controlled motor operated rheostat 144 until the movable arm 145 is rotated to a position out of contact with the resistance element 143 so that no current is supplied to the eight torque motors 30, whereupon the output torque of these torque motors is reduced to zero. Therefore, upon the cutoff of the supply of electric current to the eight torque motors, the corresponding spiral springs 48 unwind to release the stored energy in these springs to effect a full application of the brakes. Consequently, the full force of each spiral spring 48 is effective to press the corresponding brake shoe carried by the respective brake head 1 against the tread surface of the corresponding wheel to provide a maximum braking force on the wheel.

Should brake shoe wear occur while a brake application is in effect, the hereinbefore mentioned slack adjusting mechanism, including the pawl operating linkage 80 (FIG. 2), operates to take up slack or compensate for this brake shoe wear.

The above-described full brake application can be subsequently released by the engineer in the same manner as hereinbefore described for effecting a brake release subsequent to effecting a light brake application, it being understood that the microswitch devices 156 and 163 and the colored indicating lamps 151, 167 and 168 operate upon effecting a full brake application and a subsequent brake release, in the manner hereinbefore described.

If the loss of supply of electric power to the eight torque motors of the eight brake assemblies should occur while the brakes are released as the result of, for example, a break in one of the wires 142, 147 or 149 (FIG. 5), the respective spirial spring 48 of each one of the eight brake assemblies for the eight wheels of the two-truck car will effect, in the manner hereinbefore described, a full brake application on the corresponding wheel. The four inoperative brake assemblies of the respective car truck located at one or the other end of the car may be manually released in a manner which will now be described in detail, it being understood that the four inoperative brake assemblies of the other car truck may be subsequently manually released in the same manner.

Let it be supposed that the four inoperative brake assemblies of the truck located at one end of the car are connected to the manual release lever mechanism or linkage shown in FIG. 6 of the drawings. To effect a manual release of the four inoperative brake assemblies located at the one end of the car, a trainman will apply a wrench to either the upper hexagon hub 117 or the lower hexagon hub 118, shown in FIG. 6, according to which side of the car he is standing on. Let it be supposed that the trainman is standing on that side of the car so as to be in a position to apply a wrench to the lower hexagon hub 118, shown in FIG. 6, it then being understood that this lower hexagon hub 118 is the hexagon hub 118 shown in FIGS. 7 and 8 of the drawings. Subsequent to applying a wrench to the hexagon hub 118, the trainman will manually rotate the wrench clockwise, as viewed in FIGS. 7 and 8, to exert, through the wrench, a torque on the hexagon hub 118 that, at the beginning of the rotation of the wrench, is effective to rotate the latch 114 clockwise, as viewed in FIG. 7, about the axis of the corresponding short shaft 120, which shaft is connected to the latch 114 by the pin 121, as shown in FIG. 6 of the drawings, so that the shaft 120 is rotated with the latch. As can be seen from FIG. 6, the portion of reduced diameter 113 of each of the rods 110 of the links 109 is pivotally connected to the corresponding latch 114 by the corresponding pin 15, and the two latches 114 are operatively connected one to the other by the rod 122 and pins 124. Therefore, as the lower latch 114, shown in FIG. 6, to the hub 118 of which has been applied the wrench, is rotated clockwise, as viewed in FIG. 7, the upper latch 114, shown in FIG. 6, will be rotated therewith in the same direction.

As the two latches 114 are thus rotated clockwise, the pin 115 carried by each latch is moved therewith, each point on the axis of each pin 115 traveling in an arc, the center of which lies on the axis of the corresponding short shaft 120 and rod 122.

Since each pin 115 extends through a bore in the portion of reduced diameter 113 of the corresponding rod 110 adjacent the outer end thereof, this end of the corresponding rod 110 is lifted upward or carried with the pin 115, so that as each pin 115 is rotated by the corresponding latch 114, a point on the axis of the pin 115 travels or rotates clockwise through an arc indicated by the reference numeral 194 in FIG. 7. It should be noted that the torque exerted by the trainman on the wrench is effective to simultaneously rotate the axes of the short shaft 120 and rod 122 counterclockwise about the axes of the corresponding cap screw 107, so that a point on the axis of the short shaft 120 and rod 122 travel counterclockwise on an arc indicated by the reference numeral 195 in FIGS. 7 and 8. It is, therefore, apparent from FIG. 7 that each pin 115, as it rotates with its corresponding latch 114 about the axis of the short shaft 120, as the axis of short shaft 120 rotates about the axis of the corresponding cap screw 107, is effective to rock the corresponding link 109 clockwise about the pin 126 and also to exert a push or thrust on this link 109, which thrust acts in the direction of the right hand. This thrust on each link 109 is transmitted through the corresponding pin 126 to the corresponding right-hand manual release lever 104, shown in FIG. 6, to effect clockwise rocking of this lever 104, as viewed in FIG. 7, about the corresponding cap screw 107 on which this lever is pivotally mounted.

As each of the two manual brake release levers 104 shown on the right-hand side of FIG. 6 is rocked clockwise, as viewed in FIG. 7, the corresponding arm 103 of each lever is effective, through the intermediary of the corresponding clevis 102, pin 105, short link 99 (FIGS. 1, 2 and 7), and pin 100, to move the corresponding rod 91 (FIG. 2) in an upward direction. The upward movement thus imparted to each of the two rods 91 (FIG. 2) corresponding to the two manual release levers 104, shown on the right-hand side of FIG. 6 of the drawings, is transmitted through the corresponding block 89 and pins 92 and 88 (FIG. 2) to the respective locking rod 86 so that it is lifted upward, as viewed in FIG. 2. As each of the two locking rods 86 is thus lifted upward, the corresponding lower end thereof is moved upward therewith and out of the corresponding notch or indentation 85 in the respective spring barrel 16.

As the locking rod 86 of each of the two brake assemblies having, respectively, the two manual brake release levers 104, shown on the right-hand side of FIG. 6, is thus lifted upward so that the lower end thereof is moved out of locking engagement with the corresponding spring barrel 16, the spiral spring 48 that has its outer end anchored to this spring barrel is rendered effective to drive or rotate the spring barrel 16 and the corresponding annular internal gear 19 press-fitted into the counterbore 18 in the spring barrel 16 in a clockwise direction, as viewed in FIG. 2, until the spiral spring 48 is completely unwound and the stored energy therein released, thus effecting a complete release of the braking force pressing the brake shoe of each of the two brake assemblies against the tread surface of the corresponding wheel.

As each spring barrel 16 and corresponding annular internal gear 19 are thus rotated clockwise, as viewed in FIG. 2, by the corresponding spiral spring 48, the annular internal gear 19 is effective to rotate each of the three gears 20 clockwise on its corresponding bushing 21 without effecting rotation of the corresponding spring arbor 24. This clockwise rotation of the three gears 20, each of which has a line of contact with the sun gear 37, is effective to cause the sun gear 37 to rotate counterclockwise, as viewed in FIG. 2. The sun gear 37 is operatively connected to the armature shaft 33 of the corresponding torque motor 30 by the key 35. Therefore, the armature shaft 33 and the armature of the torque motor 30 will rotate with the sun gear 37. However, since it has been assumed that a break has occurred in one of the wires 142, 147 or 149, no current is being supplied to the torque motor 30 and this rotation of its armature is without effect.

The above-mentioned upward movement of each rod 91 in response to the clockwise rocking of the corresponding manual release lever 104 of each of the two brake assemblies shown on the right-hand side of FIG. 6 is limited by the upper end of the corresponding sleeve 95 that surrounds the rod 91 striking or contacting the bottom side of the top wall 11 (FIG. 2). Therefore, upon each sleeve 91 contacting the bottom side of the corresponding top wall 11, the corresponding manual release lever 104 is prevented from being further rocked in a clockwise direction, from the position shown in FIG. 8, in response to the thrust applied thereto from the corresponding link 109 via pin 126. It should be understood that the lower end of the locking rod 86 has been lifted up far enough to release the spring barrel 16 prior to the upper end of the corresponding sleeve 95 contacting the bottom side of the top wall 11.

As previously stated, the torque exerted by the trainman on the wrench is effective to rotate the axes of the short shafts 120 and 122 counterclockwise about the axis of the corresponding cap screw 107 (FIG. 7). This counterclockwise rotation effects counterclockwise rotation of each of the two manual brake release levers 104 shown on the left-hand side of FIG. 6, since that end of each of the short shafts 120 that has a portion of reduced diameter, and the portion of reduced diameter at the corresponding end of rod 122, are disposed in the respective jaws of the clevis 108 of the corresponding manual brake release 104.

As these two manual release levers 104, shown on the left-hand side of FIG. 6, are simultaneously rocked counterclockwise as the other two manual release levers 104 are rocked clockwise, such that they move from the position of the left-hand manual release lever 104, shown in FIG. 7, to the position of this lever shown in FIG. 8, the corresponding arm 103 of each lever is effective, through the intermediary of the corresponding clevis 102, pin 105, short link 99 and pin 100 (FIGS. 7 and 8) to move the corresponding rod 91 (FIG. 2) in an upward direction until the sleeve 95 contacts the bottom side of the top wall 11 of the respective brake assembly. This upward movement of the rods 91 of the respective two brake assemblies shown on the left-hand side of FIG. 6 is effective to lift the corresponding locking rods 86 and effect unlocking of the spring barrels 16 of these two brake assemblies, in the manner hereinbefore explained, to cause a release of the force of the spiral spring 48 of these two brake assemblies, thereby releasing the braking force pressing the brake shoe of each of these two brake assemblies against the tread surface of the corresponding wheel simultaneously as the braking force of the other two brake assemblies is released.

As the center of hub 118, shown in FIG. 7, is moved through the arc 195 toward the position in which the center of this hub is shown in FIG. 8 by the torque force applied to the wrench by the trainman, this hub, together with the lower latch 114 (FIG. 6) of which it is an integral part, are rotated clockwise until this latch 114 reaches the position in which it is shown in FIG. 8. In this position of the latch 114, the web 116a of this latch contacts the upper surface of the portion 113 of the rod 110 of the corresponding link 109 to prevent further clockwise rotation of this latch and also further counterclockwise rocking of the corresponding manual release lever 104 shown on the left-hand side of FIGS. 7 and 8.

Since the lower latch 114 is connected to the upper latch 114 by the rod 122 and pins 124, as shown in FIG. 6, it will be understood that the upper latch 114 and the upper left-hand manual release lever 104, shown in FIG. 6, move simultaneously with the lower latch 114 and the lower left-hand manual release lever 104 until the web 116a of the upper latch 114 contacts the upper surface of the portion 113 of the rod 110 of the corresponding link 109.

It should be understood that each of the two manual release levers 104, shown on the left-hand side of FIG. 6, are rocked counterclockwise far enough to effect lifting of the corresponding locking rods 86 (FIG. 2) out of locking engagement with the respective spring barrels 16 prior to the webs 116a of the two latches 114 contacting the upper surface of portion 113 of the rod 110 of the corresponding link 109. Consequently, the braking force exerted by the respective spiral springs 48 of the two brake assemblies shown on the left-hand side of FIG. 6 is manually released prior to the webs 116a of the two latches 114 contacting the upper surface of portion 113 of the rod 110 of the corresponding link 109.

From the foregoing, it is apparent that upon effecting a manual release of the brakes on one truck of a two-truck railway car, the braking force exerted by the two brake assemblies shown on the right-hand side of FIG. 6 and associated with the two wheels of the one wheel-and-axle assembly of the one truck is release simultaneously as the braking force exerted by the two brake assemblies shown on the left-hand side of FIG. 6 and associated with the two wheels of the other wheel-and-axle assembly of the one truck is released. The brakes on the other truck of the two-truck car can be subsequently released in the same manner as on the one truck.

Subsequent to effecting a manual release of the spring force acting on each of the eight wheels of the car in the manner just described, the car can be moved to a railway shop for repair.

When a full spring-applied brake application is effected as the result of a break in one of the wires 142, 147 or 149 (FIG. 5), the microswitch devices 156 and 163 of each of the eight brake assemblies are operated in the manner hereinbefore described to close the circuit to the colored indicating lamps 151, 167 and 168 (FIG. 5) so that these lamps are lit. Consequently, the contact 157 of each microswitch 156 and the contact 164 of each microswitch 163 will be moved to their closed position, shown in FIG. 5, upon the occurrence of a break in one of the wires 142, 147 or 149.

When a manual brake release of the eight brake assemblies is effected by lifting the locking rod 86 (FIG. 2) and the rod 91 upward, the upward movement of the rod 91 of each brake assembly is transmitted to the corresponding pin 92 which connects the rod 91 to the corresponding block 89 so that the pin 92 moves upward with rod 91. As the pin 92 (FIG. 2) is thus moved upward, the head, in the form of a truncated cone, formed on the left-hand end of this pin is moved into contact with the roller 193 mounted on the pin 192. As this head on the left-hand end of the pin 92 continues to move upward, it is effective, through the intermediary of the roller 193, to rock the lever 191 counterclockwise, as viewed in FIG. 2, about the pin 190 until the lever 191 is moved into contact with the contact actuating plunger 173 of the microswitch device 159. As the lever 191 is further rocked counterclockwise about the pin 190 in response to the pin 92 continuing to move upward until the sleeve 95 contacts the bottom side of the top wall 11, the contact actuating plunger 173 is effective to move the contact 160 (FIG. 5) of the microswitch device 159 from the position in which it is shown in FIG. 5 to a second position in which it opens the circuit to the indicating lamp 151 located in the car and establishes a circuit from the wire 162 to the wire 161. When the contact 160 is thus moved to its second position, it establishes a power supply "stick circuit" to the colored indicating lamps 167 and 168 located on each side of the back end of the car. This power supply circuit extends from the positive terminal of the battery or source of electrical power 141 via the wires 142 and 154, cutout switch 153, wire 152 and wire 169 to one terminal of each of the colored indicating lamps 167 and 168, thence from the other terminal of these lamps via wire 166, branch wires 166b and 166a wire 162, contact 160 of the microswitch device 159, wire 161, branch wire 150a, and common return wire 150, to the negative terminal of the battery or source of electric power 141.

When a manual brake release of the eight brake assemblies is effected by lifting the locking rod 86 of each brake assembly upward out of engagement with an indentation 85 in the corresponding spring barrel 16, the spiral spring 48 that has its outer end anchored to the spring barrel 16 is rendered effective as it unwinds, to rotate the spring barrel 16 and the annular internal gear 19 clockwise, as viewed in FIG. 2, until the spiral spring has completely unwound.

From the foregoing, it will be understood that upon effecting a manual release of the brakes on the two-truck car, subsequent to a spring-applied brake application occurring as a result of a break in one of the wires 142, 147 or 149 in the electric power supply circuit to the eight torque motors 30 associated respectively with the eight brake assemblies provided for the eight wheels of the two-truck car, the colored indicating lamp 151 located inside of the car will be extinguished to apprise the engineer of the fact that the brakes on the car have been manually released, and a "stick circuit" will be established for the two colored indicating lamps 167 and 168 located on the opposite sides of the back end of the car so that these lamps remain lit subsequent to effecting the manual release of the brakes on the car. By establishing a "stick circuit" so that the indicating lamps 167 and 168 remain lit, subsequent to effecting a manual release of the brakes, the engineer of a train approaching the back end of the car at night or during a fog would be notified of the presence of the car prior to colliding with it.

It will be assumed that prior to repairing the break in one of the wires 142, 147 or 149 (FIG. 5), a repairman will open the switches 148 and 153 to cut off the supply of electric power from the source of electric power 141 to insure his safety from electrical shock or injury while making the necessary repairs.

Therefore, subsequent to making the necessary repairs, let it be supposed that it is desired that the eight brake assemblies on the car be conditioned so that the car can be again placed in revenue service. To condition the eight brake assemblies on the two-truck car so that the car can be placed in revenue service, the switches 148 and 153 (FIG. 5) will be manually closed by the engineer or other person in charge of conditioning the car for service.

Since it was assumed that the loss of supply of electric power occurred while the brakes were released, the movable arm 145 of the remote controlled motor operated rheostat 144 will, therefore, be in the position to provide a minimum amount of the resistance 143 in the power supply circuit to the torque motors 30. Therefore, upon reclosure of the switches 148 and 153, the current supplied to the torque motors 30 will cause the torque output of these motors to increase to its maximum value. Consequently, each torque motor 30 will, through its armature shaft 33, the key 35 and hub 36 of sun gear 37, rotate this sun gear clockwise, as viewed in FIG. 2. Since the spring barrel 16 is now unlocked, the three gears 20 act like spokes in a wheel of which the sun gear 37 is the hub and the annular internal gear 19 is the rim. Therefore, the clockwise rotation of the sun gear 37 by the torque motor 30 causes the annular internal gear 19 and the spring barrel 16 to rotate clockwise. Since the outer end of the spiral spring 48 is anchored to the spring barrel 16 and the inner end of this spring is anchored to the hub 25 of the spring arbor 24, the above-mentioned clockwise rotation of the spring barrel 16 transmits a force or thrust through the unwound spiral spring 48 to the hub 25 which is effective to cause the spring arbor 24 to rotate clockwise, as viewed in FIG. 2. Since the key 41 (FIG. 1) operatively connects the hub 25 of the spring arbor 24 to the portion of reduced diameter 40 at the right-hand end of the screw 38, this clockwise rotation of the spring arbor 24 effects rotation of the screw 38 therewith to cause the traveling nut 50 ot travel along the screw 38 in the direction of the right hand until the spring seat 61 carried by the traveling nut 50 abuts the flat annular plate 49, as shown in FIG. 1. As the traveling nut 50 travels along the screw 38 to the position shown in FIG. 1, it is effective to rock the brake lever 71 counterclockwise to its brake release position, thereby moving the brake shoe carried by the brake head 1 away from the tread surface of the corresponding wheel.

After the spring seat 61 has moved into abutting relationship with the flat annular plate 49, the screw 38 and the spring arbor 24 are prevented from rotating. Since the three shafts 22 are carried by the spring arbor 24, these shafts are stationary upon cessation of rotation of the spring arbor 24. Therefore, as the sun gear 37 continues to be rotated clockwise by the torque motor 30, this clockwise rotation of the sun gear 37 now causes counterclockwise rotation of the three gears 20 which, in turn, drive the annular internal gear 19 and the spring barrel 16 counterclockwise, as viewed in FIG. 2. Since the inner end of the spiral spring 48 is anchored to the hub 25 of the now stationary spring barrel 24 and the outer end of this spring is anchored to the spring barrel 16, which is now rotating in a counterclockwise direction, as viewed in FIG. 2, the spiral spring 48 will be completely wound up, it being understood that the torque motor 30 is stalled when the spiral spring 48 is completely wound up.

If it is desired that the spiral springs 48 of the eight brake assemblies be wound to a chosen degree somewhat less than a complete windup, the remote controlled motor operated rheostat 144 will be operated to cut into the power supply circuit a small amount of the resistance 143 (FIG. 5), the amount depending on the degree of windup desired. With a small amount of the resistance 143 cut into the power supply circuit, the torque motors 30 of the eight brake assemblies will wind up their corresponding spiral springs 48 until the potential energy of each spring balances the output torque of the corresponding torque motor.

The number of complete revolutions of the spring barrel 16 necessary to wind up the spiral spring 48 to the desired degree may be noted from the numerals on the hub 130 (FIG. 4), and when the spiral springs 48 of the eight brake assemblies have been wound up to the desired degree, the torque motors 30 will be stalled since the output torque of each torque motor 30 will be balanced by the stored potential energy in the corresponding spiral spring 48.

Subsequent to the windup of the spiral springs 48 of the eight brake assemblies on the two-truck car, a trainman will first place a wrench on the hub 118 of the lower latch 114 or on the hub 117 of the upper latch 114 shown in FIG. 6 and associated with one truck of the two-truck car. Then, by manually exerting a torque on the wrench in the proper direction, effect movement of the two latches 114 and the four manual release levers 104 of the one truck from the position in which they are shown in FIG. 8 back to the position in which they are shown in FIG. 7, it being understood that movement of the latches 114, links 109 and levers 104 is just the reverse of that previously described in connection with their movement from the position in which they are shown in FIG. 7 to the position in which they are shown in FIG. 8.

As the manual release lever 104 of each of the four brake assemblies associated with the one truck of the two-truck car is rocked back to its original position, the corresponding spring 96 (FIG. 2) is rendered effective, through the intermediary of the respective block 89 and pins 92 and 88, to move or push the corresponding locking rod 86 downward until the lower end thereof contacts the periphery of the spring barrel 16 of the respective brake assembly, it being understood that the spring barrel 16 may or may not be in such a position that one of the indentations 85 on the periphery thereof will be in alignment with the locking rod 86 so that the lower end of the locking rod may be received therein.

Subsequent to the trainman effecting movement of the two latches 114 and the four manual release levers 104 of the one truck to their orignal positions in the manner just explained, he will effect movement of the two latches 114 and the four manual release levers 104 of the other truck of the two-truck car to their original positions so that the locking rod 86 that is operatively connected to each manual release lever 104 associated with this truck is moved downward until the lower end thereof contacts the periphery of the corresponding spring barrel 16.

It will be understood that when the spiral springs 48 of the eight brake assemblies are wound up to the desired degree, the corresponding spring barrels 16 may or may not be in such a position that one of the indentations 85 thereon is in alignment with the corresponding locking rod 86. If an indentation 85 on the periphery of the spring barrel 16 of certain of the eight brake assemblies is in alignment with the corresponding locking rod 86, the springs 96 of these certain brake assemblies will, through the intermediary of the corresponding blocks 89 and pins 88 and 92, force these locking rods downward so that the lower end thereof will be disposed in the indentation 85 that is in alignment therewith to thereby lock the corresponding spring barrels 16 of these certain brake assemblies against rotation.

If an indentation 85 on the periphery of the spring barrel 16 of the remaining brake assemblies is not in alignment with the corresponding locking rod 86, the springs 96 of the remaining brake assemblies will, through the intermediary of the corresponding blocks 89 and pins 88 and 92, force these locking rods downward until the lower end thereof contacts the periphery of the corresponding spring barrel 16 between two of the indentations on the periphery thereof. Subsequent to the lower end of these locking rods 86 being moved into contact with the periphery of the corresponding spring barrels 86, the elongated slot 90 in the corresponding blocks 89 allows the respective rods 91 to be moved downward relative to the now stationary blocks 89 and locking rods 86. Therefore, the manual release levers 104 of these remaining brake assemblies can be returned from the position in which they are shown in FIG. 8 to the position in which they are shown in FIG. 7 in response to the torque exerted by the trainman on the wrench applied to the hub of one of the latches 114. Consequently, the two links 109 and the two latches 114 can be returned to the position shown in FIG. 7.

In order to effect rotation of the spring barrels 16 of the remaining brake assemblies to a position in which an indentation 85 thereon is in alignment with the corresponding locking rod 86, the electric current supplied to the torque motors 30 may be decreased to cause the corresponding spiral spring 48 of each of these remaining brake assemblies to slightly unwind and thereby cause clockwise rotation of the corresponding spring barrels 16 until one of the indentations on the periphery thereof is in alignment with the lower end of the corresponding locking rod 86 whereupon the corresponding spring 96 will force the lower end of the locking rod 86 into the indentation 85 that is in alignment therewith to thereby lock the respective spring barrels 16 against rotation. All of the spiral springs 48 of the eight brake assemblies of the two-truck car are now wound up to the desired degree and their corresponding winding barrels 16 locked against rotation. Consequently, the two-truck car is ready for revenue service since a brake application can now be effected in the manner hereinbefore described.

It may be noted that the parts of the mechanism comprising each brake assembly are not subject to a violent or severe shock each time the brake shoe carried by the brake head 1 is moved into contact with the tread surface of its corresponding wheel since, upon the brake shoe contacting its corresponding wheel, the spring 63 provides a yieldable connection or cushioning means interposed between the brake lever 71 and the traveling nut 50 which allows the traveling nut 50 to travel along the screw 38 a short distance after the brake shoe has been brought into contact with the tread surface of the corresponding wheel, it being understood that the spring seat 61 which is carried on the threaded portion 51 of the traveling nut 50 moves with the traveling nut and compresses the spring 63 since the lever spring seat 52, which is connected to the brake lever 71 via the trunnion lugs 53 and the legs 70 of the brake lever 71, remains stationary subsequent to the brake shoe contacting the tread surface of the corresponding wheel. Since the parts of the brake assembly are thus not subject to a severe shock each time a brake application is effected, wear of these parts is greatly reduced which correspondingly lengthens their useful life.

Figure 9:
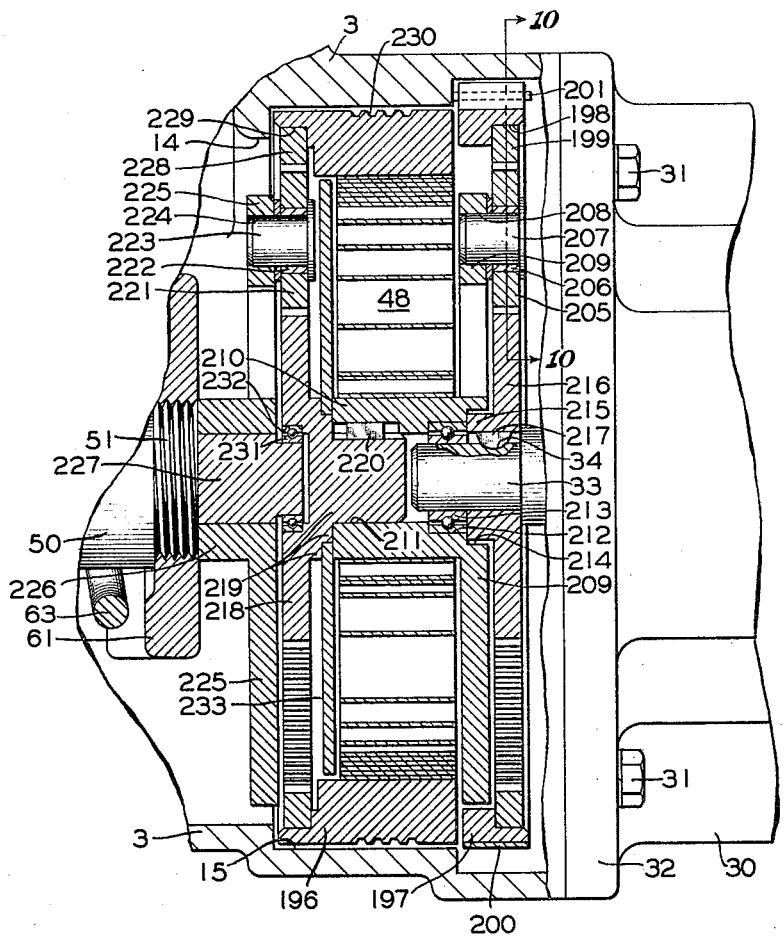
FIG. 9 is a vertical cross-sectional view of part of the brake assembly shown in FIG. 1 embodying a modified form of gear train mechanism constructed in accordance with a second embodiment of the invention.

*Description—FIGS. 9 and 10*

In FIGS. 9 and 10 of the drawings, there is shown a portion of a brake assembly constructed in accordance with a second embodiment of the invention. According to this second embodiment of the invention, two gear trains are provided, one carried at each end of the spring barrel, as shown in FIG. 9, between the torque motor and the brake-applying lever, which two gear trains replace the single gear train shown in FIG. 1. The right-hand one of these two gear trains shown in FIG. 9 is similar to the gear train shown in FIG. 1, except for the provision of a one-way slip clutch between the annular internal gear of this right-hand gear train shown in FIG. 9 and the spring barrel. The two gear trains and the one-way slip clutch of this brake assembly are shown in FIGS. 9 and 10. The brake assembly constituting the second embodiment of the invention is identical in construction to the brake assembly shown in FIGS. 1 to 4 of the drawings, except the single gear train of the brake assembly constituting the first embodiment of the invention is replaced by two gear trains and a one-way slip clutch, as mentioned above. Accordingly, like reference numerals have been used to designate the structure shown in FIGS. 9 and 10 which is identical with that shown in FIGS. 1 to 5, inclusive. Only such features of the structure and operation of the embodiment of the invention shown in FIGS. 9 and 10 which differ from that of the embodiment of FIGS. 1 to 5, inclusive, will be hereinafter described.

According to the embodiment of the invention disclosed in FIGS. 9 and 10, a hollow rotatable spring barrel 196, open at both ends, is disposed in the counterbore 15 formed in the right-hand side wall of the main casing section 3, as shown in FIG. 9. Concentric with the spring barrel 196 and arranged adjacent the right-hand end thereof, as shown in FIG. 9, is an annular internal gear carrier 197 having a counterbore 198 extending inward from its right-hand end. Press-fitted into the counterbore 198 is an annular internal gear 199 of a first planetary gear unit or train.

The annular internal gear carrier 197 is connected to the main casing section 3 through a one-way slip clutch now to be described. Disposed about the annular internal gear carrier 197, as shown in FIGS. 9 and 10, is a flexible metallic band 200. As shown in FIG. 10, the right-hand end of the flexible metallic band 200 is bent into substantially a semicircle about a pin 201 that has one end thereof anchored to the main casing section 3 by being press-fitted into a counterbore (not shown) therein. The left-hand end of the flexible metallic band 200 is bent outward to form a spring seat 202 between which and a spring seat 203 formed on the main casing section 3 is interposed a spring 204 which is effective to constantly urge the spring seat 202 in the direction of the pin 201 thereby to cause the flexible metallic band 200 to grip or be tightened against the peripheral surface of the annular internal gear carrier 197.

The annular internal gear 199 has a line of contact with three equally arcuately spaced gears 205, only one of which appears in FIG. 9 of the drawings, it being understood that these three gears 205 correspond to the three gears 20 shown in FIG. 2. Each of the three gears 205 is rotatably mounted on a corresponding bushing 206 which is press-fitted onto one end of one of three short shafts 207, only one of which appears in FIG. 9. These three short shafts 207 are equally arcuately spaced the same as the three short shafts 22 shown in FIG. 2, and have their respective opposite end press-fitted into a corresponding bore 208, one of which appears in FIG. 9, formed in a spring arbor 209 that is provided with a hub 210 having a bore 211 extending therethrough. As viewed in FIG. 9 of the drawings, the bore 211 has extending inward from its right-hand end a first counterbore 212 in which is press-fitted the outer race member of a ball bearing assembly 213 in which is mounted the left-hand end of the armature shaft 33 of the torque motor 30, and a second counterbore 214 substantially larger in diameter than the counterbore 212. As shown in FIG. 9, a hub 215 of a sun gear 216 is mounted on the armature shaft 33 on the right-hand side of the ball bearing assembly 213. This hub 215 is disposed in the counterbore 214 and is connected to the armature shaft 33 of the torque motor by a key 217 that is received in the keyway 34 in the armature shaft 33 and a corresponding keyway formed in a bore extending through the hub 215 of the sun gear 216 which has a line of contact with each of the three gears 205.

The inner end of the spiral spring 48 that is disposed within the spring barrel 196 is secured to the hub 210 in the same manner as the inner end of the spiral spring 48 of the first embodiment of the invention is secured to the hub 25. The outer end of the spiral spring 48 of this second embodiment of the invention is anchored to the spring barrel 196.

The left-hand one of the hereinbefore-mentioned two gear trains shown in FIG. 9 comprises a sun gear 218 having a stepped hub 219, the outer end of which is received in the left-hand end of the bore 211 in the hub 210 of the spring arbor 209. One of the steps of the stepped hub 219 abuts the left-hand end of the hub 210, as shown in FIG. 9, and these hubs are respectively provided with corresponding keyways in which is disposed a key 220 that is effective to provide a driving connection between the spring arbor 209 and the sun gear 218, whereby rotation of the spring arbor 209 effects corresponding rotation of the sun gear 218 which has a line of contact with each of three equally arcuately spaced gears 221 of this second gear train, only one of which gears 221 appears in FIG. 9. Each of the three gears 221 is rotatably mounted on a corresponding bushing 222 which is press-fitted onto one end of one of three short shafts 223, only one of which appears in FIG. 9. These three short shafts 223 are equally arcuately spaced and have their respective opposite ends press-fitted into a corresponding bore 224, only one of which appears in FIG. 9, formed in a planet gear carrier 225 that is provided with a hollow hub 226 press-fitted onto a cylindrical portion 227 of reduced diameter formed adjacent the right-hand end of a screw (not shown) corresponding to the screw 38 shown in FIG. 1 of the drawings, this press-fit providing a driving connection between the planet gear carrier 225 and the screw.

Each of the three above-mentioned gears 221 has a line of contact with an annular internal gear 228 that is press-fitted into a counterbore 229 formed in the left-hand end of the spring barrel 196, as shown in FIG. 9.

The outer periphery of the spring barrel 196 is provided with a helical thread 230 which may be identical to the helical thread 128 formed on the outer periphery of the spring barrel 16 shown in FIG. 1. This helical thread 230 constitutes a worm which meshes with the worm wheel 129 of a spring wind-up indicator which may be identical in construction to the spring windup indicator shown in FIG. 4 of the drawings.

The right-hand end of the above-mentioned cylindrical portion 227 (FIG. 9) of the hereinbefore-mentioned screw is of a lesser diameter so as to be adapted to have press-fitted thereon the inner race of a ball bearing assembly 231, the outer race of which is received with a sliding fit in a counterbore 232 extending inward from the left-hand side of the sun gear 218. The ball bearing assembly 231 thus serves as a support for the right-hand end of the screw corresponding to the screw 18 shown in FIG. 1.

It will be understood that the outer periphery of the spring barrel 196 is provided with a plurality of arcuately spaced notches or indentations (not shown) which correspond to the notches or indentations 85 (FIG. 2) provided on the periphery of the spring barrel 16 shown in FIGS. 1 and 2. The purpose of these indentations on the periphery of the spring barrel 196 is to provide a means of locking the spring barrel 196 against rotation by the spiral spring 48 by reason of a lock provided by the lower end of such as a locking rod 86 (FIG. 2) of a locking mechanism, which locking mechanism is identical to that described in detail in connection with the first embodiment of the invention and, therefore, need not be repeated.

Disposed about that one of the steps of the stepped hub 219 that abuts the left-hand end of the hub 210 and within the hollow spring barrel 196 is a flat annular plate 233, the right-hand side of which abuts the left-hand end of the hub 210, this plate 233 corresponding to the flat annular plate 49 shown in FIG. 1 of the drawings.

Operation—FIGS. 9 and 10

It will be understood that the torque motor 30, shown in FIG. 9, is supplied with electric power through the circuitry shown in FIG. 5 of the drawings. When the torque motor 30, shown in FIG. 9, is supplied with current through its respective power supply circuit, this torque motor is rendered effective to rotate its armature shaft 33 (FIG. 9).

Let it be assumed that the spring barrel 196 is not locked against rotation by the lower end of a locking rod, such as the locking rod 86 shown in FIG. 2, being disposed in one of the indentations formed on the periphery of this spring barrel.

Let it also be assumed that when each brake assembly is initially assembled, the corresponding brake lever, traveling nut and ball nut spring seat 61 occupy their release position in which the ball nut spring seat 61 abuts the left-hand end of the hub 226 of the planet gear carrier 225, as shown in FIG. 9, and that the corresponding spiral spring 48 is completely unwound.

The armature shaft 33, shown in FIG. 9, is connected to the hub 215 of the sun gear 216 by means of the key 217. Therefore, assuming that the armature shaft 33 rotates in the same direction as in the first embodiment of the invention, this rotation of the armature shaft 33 effects counterclockwise rotation of the sun gear 216 therewith, as viewed in FIG. 10. This counterclockwise rotation of the sun gear 216 is effective to cause clockwise rotation of the three gears 205 on their respective bushings 206. This clockwise rotation of the three gears 205 tends to cause the annular internal gear 199 to rotate clockwise, as viewed in FIG. 10. This force or tendency for the annular internal gear 199 to rotate clockwise, as viewed in FIG. 10, is effective to cause the flexible metallic band 200 to be gripped tighter about the periphery of the internal gear carrier 197, due to the friction between the surfaces of the band and the carrier, so that the flexible metallic band 200 becomes effective to lock the internal gear carrier 197 and the annular internal gear 199 against rotation in a clockwise direction, as viewed in FIG. 10. Therefore, upon the annular internal gear 199 becoming thus locked against rotation in a clockwise direction, as viewed in FIG. 10, the three gears 205 will roll counterclockwise around the inside of the internal gear 199 as each rotates clockwise on its corresponding bushing 206. As the three gears 205 thus rotate or roll counterclockwise around the inside of the annular internal gear 199, as viewed in FIG. 10, the spring arbor 209 is rotated counterclockwise, as viewed in FIG. 10, since the three bushings 206, on which the three gears 205 are rotatably mounted, are press-fitted onto one end of three corresponding shafts 207, each of which has its respective opposite end press-fitted into a corresponding bore 208 formed in the spring arbor 209.

As can be seen from FIG. 9 of the drawings, the spring arbor 209 has formed integral therewith the hub 210 which is operatively connected to the stepped hub 219 of the sun gear 218 by the key 220. Consequently, the sun gear 218 will rotate with the spring arbor 209.

This rotation of the sun gear 218 is effective to drive or cause rotation of each of the three gears 221 on its respective bushing 222 which is press-fitted onto one end of a corresponding short shaft 223 that has its opposite end press-fitted into a corresponding bore 224 in planet gear carrier 225, shown in FIG. 9. Each of the three gears 221 has a line of contact with the annular internal gear 228 that is press-fitted into the counterbore 229 in the spring barrel 196.

It should be understood that since the spring seat 61 abuts the left-hand end of the hub 226 of the planet gear carrier 225, this carrier is prevented from rotating at this time. Therefore, the above-mentioned rotation of the three gears 221 on their respective bushings 222 is effective to drive or cause rotation of the annular internal gear 228 and the spring barrel 196 in the same direction which is opposite the direction of rotation of the spring arbor 209 and its hub 210. Since the inner end of the spiral spring 48 is anchored to the hub 210 and the outer end of this spring is anchored to the spring barrel 196, and the hub 210 and the spring barrel 196 are rotating in opposite directions, the spiral spring 48 will be completely wound up.

Subsequent to the complete windup of the spiral spring 48 of each of the eight brake assemblies on the two-truck car, the locking rods of these brake assemblies are moved downward, in the manner hereinbefore described for the first embodiment of the invention, until the lower end of each rod contacts the periphery of the corresponding spring barrel 196, it being understood that the spring barrels 196 may or may not be in such a position that one of the indentations thereon will be in alignment with the corresponding locking rod so that the lower end of the locking rod may be received therein. It will be further understood that those spring barrels that are not initially locked are rotated by their corresponding spiral springs, in response to a decrease in the current supplied to the torque motors, in the same manner as described in connection with the first embodiment of the invention, to a position in which an indentation on the periphery thereof is in alignment with the corresponding locking rod whereupon these spring barrels are also locked against rotation.

In operation, when it is desired to effect a brake application less than a full brake application, the engineer will, in the manner explained in detail for the first embodiment of the invention, increase the amount of resistance in the power supply circuit for the torque motor 30 of each of the eight brake assemblies provided for the respective eight wheels on the two-truck car.

As the amount of the resistance in the power supply circuit to the eight torque motors is increased, the energizing current supplied to these torque motors is correspondingly reduced to cause a corresponding reduction in the output torque of these motors. Consequently, upon this reduction in the output torque of the torque motor 30, shown in FIG. 9 of the drawings, there is insufficient force to maintain the corresponding spiral spring 48 in its completely wound position. Therefore, when the output torque of the torque motor 30, shown in FIG. 9, is reduced in the manner just explained, the corresponding spiral spring 48 unwinds and partially releases the stored energy in the spring to apply a force to the brake shoe in the manner hereinafter explained, until the remaining stored energy in the spring balances the reduced output torque of the torque motor 30, shown in FIG. 9. As the spiral spring 48 unwinds to release the stored energy therein, this spiral spring effects rotation of the hub 210 and spring arbor 209 since the inner end of the spiral spring 48 is secured to the hub 210.

Furthermore, as the spiral spring 48 unwinds, it is also effective to cause rotation of the sun gear 218 simultaneously with rotation of the spring arbor 209, since the hub 210 of the spring arbor 209 is operatively connected to the stepped hub 219 of the sun gear 218 by the key 220, as shown in FIG. 9.

As the spring arbor 209 is rotated by the spiral spring 48, it carries with it the three short shafts 207, each of which has one end thereof anchored in the spring arbor 209. Each of the short shafts 207 has a corresponding bushing 206 press-fitted on its opposite end and each bushing 206 has a corresponding gear 205 rotatably mounted thereon. Each of the gears 205 has a line of contact with the sun gear 216 and also a line of contact with the annular internal gear 199. Therefore, the three gears 205 act like spokes in a wheel in which sun gear 216 is the hub and the annular internal gear 199 is the rim. The force of spiral spring 48 is acting on the spring arbor 209 in the direction to rotate it in a clockwise direction, as viewed in FIG. 10. Consequently, the three shafts 207 carried by the spring arbor 209 will rotate clockwise with the spring arbor 209. The three gears 205 which, as stated above, act like spokes in a wheel, therefore tend to cause the annular internal gear 199 and internal gear carrier 197 to rotate clockwise with the spring arbor 209. However, this clockwise rotation of the internal gear carrier 197 is in the direction to cause the flexible metallic band 200 to be tightened about the internal gear carrier 197, thereby locking it and the annular internal gear 199 against further rotation in a clockwise direction.

Subsequent to thus locking the annular internal gear 199 against rotation, the continued clockwise rotation of the spring arbor 209, pins 207 and bushings 206, as viewed in FIG. 10, is effective to cause the three gears 205 to roll clockwise about the inside of the annular internal gear 199 as these three gears rotate counterclockwise on their respective bushings 206. This counterclockwise rotation of the three gears 205 on their respective bushings 206 is effective to cause the sun gear 216 to rotate clockwise. Since the sun gear 216 is keyed to the armature shaft 33 by the key 217 (FIG. 9), the armature shaft 33 of the torque motor 30 is likewise rotated clockwise.

The above-mentioned rotation of the sun gear 218 simultaneously with the spring arbor 209 is effective to cause the three gears 221 to rotate on their respective bushings 222 and roll around the inside of the stationary annular internal gear 228. As the three gears 221 thus roll around the inside of the annular internal gear 228, they are effective, through the intermediary of the bushings 222 and shafts 223, to rotate the planet gear carrier 225, in which one end of each of the shafts 223 is anchored. Since the hub 226 of the planet gear carrier 225 is press-fitted onto the cylindrical portion 227 of the screw of this brake assembly, this screw will be rotated simultaneously with the planet gear carrier 225 to cause the traveling nut 50 to travel along the screw in the direction of the left hand, as viewed in FIG. 9, to rock the brake lever of this brake assembly corresponding to the brake lever 71, shown in FIG. 1, in the direction to cause the brake shoe of this brake assembly to be brought into braking contact with the tread surface of the corresponding wheel to effect a braking action on this wheel.

Upon the brake shoe being brought into contact with the tread surface of the corresponding wheel, the brake lever can no longer be rocked in a brake-applying direction. Therefore, as the traveling nut 50 continues to travel along the screw in the direction of the left hand, as viewed in FIG. 9, it is effective, through the intermediary of the spring seat 61, to compress the spring 63 until the resisting force of the spring 63 balances the force acting through the screw on the traveling nut 50 to move the traveling nut 50 in the direction of the left hand. Thus, the traveling nut 50 is brought to a stop which, in turn, causes the screw and planet gear carrier 225 to cease rotating. Since the three gears 221 are carried by the planet gear carrier 225 and have a line of contact with the stationary or locked annular internal gear 228 and also with the sun gear 218, it will be apparent that when the planet gear carrier 225 ceases to rotate, the gears 221 and the sun gear 218 will likewise cease to rotate. The stepped hub 219 of the sun gear 218 is connnected to the hub 210 of the spring arbor 209 by the key 220, and the inner end of the spiral spring 48 is anchored to the hub 210, as hereinbefore mentioned. Therefore, when the sun gear 218 ceases to rotate, the spring arbor 209 likewise ceases to rotate and the spiral spring 48 can unwind no further. However, the inertia of the rotating armature, the armature shaft 33 and sun gear 216 is effective to continue the rotation of these members in a clockwise direction, as viewed in FIG. 10. With the spring arbor 209 now stationary, or stopped from rotating, as explained above, this continued clockwise rotation of the sun gear 216, as viewed in FIG. 10, due to the inertia of this sun gear, the motor armature and armature shaft 33, is effective to cause each of the three gears 205 to rotate counterclockwise, as viewed in FIG. 10, about the now stationary corresponding bushings 206 carried by the shafts 207 which are anchored at one end in the now stationary spring arbor 209. This counterclockwise rotation, as viewed in FIG. 10, of the three gears 205 is effective to cause the annular internal gear 199 and the internal gear carrier 197 to rotate counterclockwise, as viewed in FIG. 10, since this counterclockwise rotation is in the direction to cause the internal gear carrier 197 to slip within the flexible metallic band 200, as can be seen from FIG. 10. Therefore, the sun gear 216, the three gears 205, the annular internal gear 199, and the internal gear carrier 197 will rotate in the respective directions described above, until the friction between the peripheral surface of the internal gear carrier 197 and the inside surface of the flexible metallic band 200, together with the friction of the bearings of the torque motor 30, absorbs the kinetic energy of rotation of the rotating members resulting from the inertia of the rotating motor armature, armature shaft 33 and sun gear 216 at the time the spring arbor 209 ceases to rotate or is brought to a stop, until the armature and armature shaft 33 of the torque motor 30 have been rotated in the direction opposite the brake releasing direction sufficiently to cause a balance between the forces resulting from the rotating elements or masses and the reduced output torque of the torque motor 30.

From the foregoing, it is apparent that the armature of the motor 30 can continue to rotate for a time, due to its inertia, subsequent to the brake shoe being brought into braking contact with the tread surface of the corresponding wheel. By thus providing for this continued rotation of the motor armature and armature shaft 33, which causes a corresponding rotation of the sun gear 216, gears 205 and annular internal gear 199, undue stresses are not produced in these gears as is the case in the first embodiment of the invention wherein no slip-type clutch, such as the flexble metallic band 200, is provided. Furthermore, undue stresses are prevented in the brake shoe and the mechanism transmitting force from the spiral spring 48 to the brake shoe, thereby preventing excessive braking forces on the wheel.

The brakes can now be released in the manner hereinbefore explained by supplying electric power to each of the torque motors 30 through the circuitry shown in FIG. 5 of the drawings.

Let it now be supposed that the engineer desires to effect a full brake application. To effect a full brake application, the engineer, in the manner hereinbefore explained in detail, reduces to zero or cuts off the supply of electric current to the eight torque motors 30 on the two-truck eight-wheel car. Therefore, upon the cut-off of the supply of electric current to the eight torque motors 30, the corresponding spiral springs 48 unwind, as hereinbefore explained, to release the stored energy in these springs and operate the two-gear trains of each brake assembly in the manner hereinbefore explained in detail, to effect a full application of the brakes, it being understood that with no current supplied to each of the torque motors 30, the sun gear 216, the three gears 205, the annular internal gear 199, and the internal gear carrier 197 of each of the eight brake assemblies will rotate in the respective directions hereinbefore described until the friction between the peripheral surface of the internal gear carrier 197 of each respective brake assembly and the inside surface of the corresponding flexible metallic band 200, together with the friction of the bearings of the torque motor 30, absorbs all of the kinetic energy of rotation of the rotating members of the respective brake assembly resulting from the inertia of the corresponding rotating motor armature, armature shaft 33 and sun gear 216 at the time the corresponding spring arbor 209 is brought to a stop, in the manner hereinbefore explained. Consequently, the full force of each spiral spring 48 is effective to press the corresponding brake shoe against the tread surface of the corresponding wheel to provide a maximum braking force on the wheel.

The above-described full brake application can be subsequently released by the engineer, in the same manner as hereinbefore described, for effecting a brake release subsequent to effecting a brake application that is less than a full brake application.

If the loss of supply of electric power to the eight torque motors 30 of the eight brake assemblies on a two-truck car should occur as the result of, for example, a break in one of the wires 142, 147 or 149 (FIG. 5), the respective spiral spring 48 of each of the eight brake assemblies for the eight wheels of the two-truck car will effect, in the manner hereinbefore described, a full brake application on the corresponding wheel. The four inoperative brake assemblies of the respective car truck located at one or the other end of the car now may be manually released, in the manner hereinbefore described for the first embodiment of the invention, after which the four inoperative brake assemblies of the other car truck can be released in the same manner.

As the locking rod of each brake assembly is moved out of locking engagement with the corresponding spring barrel 196, the spiral spring 48 that has its outer end anchored to this spring barrel is rendered effective to drive or rotate the spring barrel 196 and the annular internal gear 228, which is press-fitted into the counterbore 229 in the spring barrel 196, until the spiral spring 48 is completely unwound and the stored energy therein released, thus effecting a complete release of the braking force pressing the brake shoe against the tread surface of the corresponding wheel.

As the spring barrel 196 and the annular internal gear 228 carried thereby are thus rotated by the spiral spring 48, the annular internal gear 228 is effective to rotate each of the three gears 221 on its corresponding bushing 222 without effecting rotation of the planet gear carrier 225, since each brake shoe is at this time in contact with the tread surface of the corresponding wheel.

Furthermore, the inner end of the spiral spring 48 is effective through the hub 210, key 220, and sun gear 218 to rotate each of the three gears 221 in the same direction as these gears 221 are rotated by the annular internal gear 228, as mentioned above.

The inner end of the spiral spring 48 is also effective through the hub 210 and spring arbor 209 to cause rotation of the spring arbor 209, the pins 207 carried thereby, bushings 206 and gears 205 clockwise, as viewed in FIG. 10. The three gears 205 act like spokes in a wheel and therefore tend to cause the annular internal gear 199 and internal gear carrier 197 to rotate clockwise with the spring arbor 209. However, this clockwise rotation of the internal gear carrier 197 is in the direction to cause the flexible metallic band 200 to lock the internal gear carrier 197 in the manner hereinbefore described against further rotation in a clockwise direction. Consequently, the continued clockwise rotation of the spring arbor 209, pins 207 and bushings 206, as viewed in FIG. 10, is effective to cause the three gears 205 to roll clockwise about the inside of the annular internal gear 199 as these three gears rotate counterclockwise on their respective bushings 206. This counterclockwise rotation of the three gears 205 on their respective bushings 206 is effective to cause the sun gear 216 to rotate clockwise. This clockwise rotation of the sun gear 216 causes the armature shaft 33 and armature of the corresponding torque motor 30 to rotate therewith until the spiral spring 48 is completely unwound, at which time the spiral spring 48 exerts no force to press the brake shoe against the tread surface of the corresponding wheel. Thus, the brakes are completely released.

Let it now be supposed that the break in that one of the wires 142, 147 or 149 (FIG. 5) that caused the power failure has been repaired so that electric power can be again supplied to the eight torque motors 30 of the eight brake assemblies on the two-truck car. Consequently, let it be supposed that the engineer now effects the supply of electric power to each of the eight torque motors 30 in the manner hereinbefore described to cause rotation of the respective motor armature, armature shaft 33 and sun gear 216 of each brake assembly in a counter clockwise direction, as viewed in FIG. 10. This counterclockwise rotation of sun gear 216 causes the three gears 205 to rotate clockwise which is in the direction to cause the flexible metallic band 200 to grip the peripheral surface of the internal gear carrier 197 and thereby prevent rotation of the annular internal gear 199. Consequently, the three gears 205 roll counterclockwise around the inside of the annular internal gear 199 to thereby drive the spring arbor 209 and its hub 210 in the same direction. Since the hub 210 is connected to the sun gear 218 by the key 220, the sun gear 218 is rotated counterclockwise with the spring arbor 209. This counterclockwise rotation of the sun gear 218 causes clockwise rotation of the three gears 221. Since the three gears 221 have a line of contact with the annular internal gear 228 which is carried by the now unlocked spring barrel 196, these gears 221 will cause the annular internal gear 228 and the spring barrel 196 to rotate clockwise. The outer end of the spiral spring 48 is anchored in the spring barrel 196 which is now rotating clockwise, and the inner end of the spiral spring 48 is anchored in the hub 210 of the spring arbor 209 which, as stated above, is now rotating counterclockwise. Therefore, after the spring barrel 196 has rotated clockwise and the hub 210 has rotated counterclockwise, a certain amount dependent on the stiffness of the spiral spring 48, the spiral spring is wound sufficiently to cause it to exert a force on the annular internal gear 228 and spring barrel 196 to stop them from being rotated in a clockwise rotation by the three gears 221. When the annular internal gear 228 is thus stopped from rotating, it is effective to stop rotation of the three gears 221 since these three gears have a line of contact with the internal gear 228. These three gears 221 now act like spokes in a wheel, the hub of which is the sun gear 218. The sun gear 218 which is now rotating counterclockwise is therefore effective to cause the planet gear carrier 225, the three gears 221 carried thereby, the annular internal gear 228 and the spring barrel 196 to rotate counterclockwise as a unit. This counterclockwise rotation of the planet gear carrier 225 and its hub 226 is effective to rotate the corresponding screw therewith to cause the traveling nut 50 to travel along the screw in the direction of the right hand to thereby rock the brake lever in the direction to move the brake shoe away from the thread surface of the corresponding wheel until the spring seat 61 abuts the left-hand end of the hub 226.

With the spring seat 61 in abutting relation with the hub 226, the screw and planet gear carrier 225 will be prevented from further rotation. Therefore, continued counterclockwise rotation of the sun gear 218 will cause the three gears 221 to rotate clockwise about the now stationary bushings 222 and pins 223 which are carried by the planet gear carrier 225. This clockwise rotation of the three gears 221 is effective to cause the annular internal gear 228 and the spring barrel 196 to rotate in a clockwise direction.

The outer end of the spiral spring 48 is anchored in the spring barrel 196 which is now rotating in a clockwise direction and the inner end of the spiral spring 48 is secured to the hub 210 which is rotating in a counterclockwise direction. Consequently, the continued clockwise rotation of the spring barrel 196 and the continued counterclockwise rotation of the hub 210 will effect a complete windup of the spiral spring 48.

Subsequent to the complete windup of the spiral spring 48 of each of the eight brake assemblies on the two-truck car which is provided with the same manual release mechanism as has been described in detail in connection with the first embodiment of the invention, a trainman will first place a wrench on the hub 118 of the lower latch 114 (FIG. 6) or on the hub 117 of the upper latch 114 associated with one truck of the two-truck car. Then, by manually exerting a torque on the wrench in the proper direction, effect movement of the manual release mechanism back to the position shown in FIG. 7. The trainman can then use the wrench to effect movement of the manual release mechanism associated with the other truck of the two-truck car back to the position shown in FIG. 7.

As the manual release lever 104 (FIG. 8) of the manual release mechanism of each brake assembly is rocked back to its original position, the corresponding spring 96 (FIG. 2) is rendered effective, through the intermediary of the corresponding block 89 and pins 92 and 88, to move the corresponding locking rod downward until the lower end thereof contacts the periphery of the corresponding spring barrel 196 (FIG. 9), it being understood that the spring barrel 196 may or may not be in such a position that one of the indentations thereon, corresponding to the indentations 85 (FIG. 2), will be in alignment with the locking rod so that the lower end of the locking rod may be received therein.

Since the spring barrel 196 of certain of the eight brake assemblies may not be in such an angular position that an indentation on its periphery is in alignment with the lower end of the corresponding locking rod, the electrical current supplied to the torque motors 30 will now be decreased in the manner hereinbefore explained in detail to cause the spiral springs 48 to slightly unwind and thereby cause counterclockwise rotation of the corresponding spring barrels 196 of these brake assemblies until one of the indentations on the periphery of each spring barrel is in alignment with the lower end of the corresponding locking rod whereupon the spring 96 will force the lower end of this locking rod into the aligned indentation to thereby lock the spring barrel 196 against rotation.

The eight brake assemblies on the two-truck car may now be operated in the manner hereinbefore described to effect an application and a subsequent release of the brakes on the eight wheels on the car.

*Description—FIG. 11*

Referring to FIG. 11 of the drawings, a modified arrangement of a brake assembly is shown which differs from the previous embodiment shown in FIGS. 1 to 8, inclusive, by the interposition of a one-way slip clutch 234 in the drive between the armature shaft 33 of the torque motor 30 shown in FIG. 1 and the sun gear 37. The purpose of the one-way slip clutch 234 is to assure against the possible undesired reapplication of the brake shoe carried by the brake head 1 as a result of the continued rotation of the armature of the torque motor 30, due to its own rotational inertia, following the complete unwinding of the spiral spring 48 as a result of a manual release of the brakes. Manual release of the brakes would ordinarily not be effected unless release of the brakes could not be effected in normal manner by energization of the torque motor due to a break in one of the wires 142, 147 or 149 (FIG. 5) through which power is supplied to the eight torque motors 30 on the railway car.

More specifically, the one-way slip clutch 234 prevents the continued rotation of the armature of the torque motor 30, due to its own rotational inertia, from driving the screw 38 via the unwound spiral spring 48 and the planetary gear train, sufficiently to shift the traveling nut 50 (FIG. 1) along the screw 38 in a left-hand direction to effect movement of the brake shoe carried by the brake head 1 into braking contact with the tread surface of the corresponding wheel and thereby causing an undesired brake application.

Having now described the invention, what I claim as new and desire to secure by Letters Patent, is:

1. A unit brake assembly for a vehicle wheel comprising:
   (a) a brake shoe means for applying a braking force to a vehicle wheel,
   (b) a pivoted lever effective upon rocking in one direction to apply said brake shoe means and upon rocking in the opposite direction to release said brake shoe means,
   (c) a screw-threaded member rotatably mounted for rotation on its longitudinal axis,
   (d) a traveling nut for said screw-threaded member and connected to said pivoted lever so as to rock said lever in opposite directions corresponding to the direction of travel of said traveling nut on said screw-threaded member as the screw-threaded member is rotated,
   (e) a spiral spring,
   (f) releasable locking means for anchoring the outer end of said spiral spring against movement when locked,
   (g) means connecting the inner end of said spiral spring to said screw-threaded member,
   (h) said spiral spring being wound upon rotation of said screw-threaded member in one direction and effective when wound to exert a force tending to rotate said screw-threaded member in the opposite direction,
   (i) power means effective to rotate said screw-threaded means in one direction to cause travel of said traveling nut in a direction to rock said pivoted lever to a position in which said brake shoe means is released and at the same time to cause wind up of said spiral spring from said inner end, and
   (j) manually operable means for causing said releasable locking means to release the outer end of said spiral spring thereby to cause complete unwinding of said spiral spring and consequent release of said brake shoe means from a braking position to which it was moved by said spiral spring.

2. A unit brake assembly for a vehicle wheel, as claimed in claim 1, further characterized in that said unit brake assembly comprises a planetary gear unit operatively interposed between said power means and screw-threaded member through which rotation of said screw-threaded member is effected in response to the supply of power to said power means.

3. A unit brake assembly for a vehicle wheel comprising:
   (a) a brake shoe means for applying a braking force to a vehicle wheel,
   (b) a pivoted lever effective upon rocking in one direction to apply said brake shoe means and upon rocking in the opposite direction to release said brake shoe means,
   (c) a screw-threaded member rotatably mounted for rotation on its longitudinal axis,
   (d) a traveling nut for said screw-threaded member having a connection to said pivoted lever so as to rock said lever in opposite directions corresponding to the direction of travel of said traveling nut on said screw-threaded member,
   (e) a spiral spring connected at its inner end to said screw-threaded member so as to be wound upon rotation of the screw-threaded member in one direction and effective when wound to exert a force tending to rotate said screw-threaded member in the opposite direction,
   (f) power means driven in one direction upon the supply of power thereto, and
   (g) a planetary gear unit comprising:
      (i) a rotatably mounted internal gear to which the outer end of said spiral spring is connected,
      (ii) a planet carrier operatively connected to said screw-threaded member,
      (iii) a sun gear operatively connected to said power means so as to be rotated thereby, and
      (iv) a plurality of spur gears carried by said planet carrier and each having respectively a line of contact with said internal gear and said sun gear whereby said power means is rendered effective in response to the supply of power thereto to sequentially, through the intermediary of said sun gear, said plurality of spur gears and said planet carrier, rotate said screw-threaded member in one direction to cause travel of said traveling nut therealong in a direction to rock said pivoted lever to a position in which said brake shoe means is released and at the same time to cause partial wind up of said spiral spring from said inner end, and thereafter, through the intermediary of said sun gear, said plurality of spur gears and said internal gear, to cause further and complete wind up of said spiral spring from its outer end.

4. A unit brake assembly for a vehicle wheel, as claimed in claim 3, further characterized by releasable locking means for locking the internal gear and thereby the outer end of said spiral spring against movement subsequent to the complete wind up of the spiral springs.

5. A unit brake assembly for a vheicle wheel, as claimed in claim 3, further characterized in that upon a decrease in the amount of power supplied to said power means, said spiral spring unwinds and exerts a force via the inner end thereof, to rotate said screw-threaded member and effect consequent movement of said traveling nut to cause rocking of said pivoted lever in said one direction to apply said brake shoe means, a torque being simultaneously transmitted via said spring arbor, said plurality of spur gears, and said sun gear to said power means to drive said power means in the direction opposite said one direction until the decreased amount of power supplied thereto balances the reduced potential energy remaining in said spiral spring subsequent to said unwinding thereof.

6. A unit brake assembly for a vehicle wheel, as claimed in claim 1, further characterized in that said releasable locking means comprises a hollow rotatably mounted barrel within which said spiral spring is disposed and to which the outer end of the spiral spring is anchored, said barrel being provided on its periphery with a plurality of arcuately spaced-apart indentations, and in that said manually operable means includes a slidably mounted spring-biased plunger one end of which is biased into any one of said indentations when in alignment therewith thereby to lock said hollow rotatably mounted barrel and thereby the outer end of said spiral spring against rotation.

7. A unit brake assembly for a vehicle wheel, as claimed in claim 6, further characterized by a rotatably mounted worm wheel provided with a plurality of indicia thereon, and in that said hollow rotatably mounted barrel is provided on its periphery with a worm which engages said worm wheel, said worm wheel having a chosen gear ratio whereby a change in the indicia reading on said worm wheel is effected according to the number of revolutions made by said hollow rotatably mounted barrel incidental to the winding or unwinding of the spiral spring.

8. A unit brake assembly for a vehicle wheel, as claimed in claim 1, further characterized by a cushioned lost-motion connection between said pivoted lever and said traveling nut, said lost-motion connection comprising:
  (a) a first spring seat disposed about said traveling nut and having a pair of diametrically arranged and oppositely extending trunnions operatively connected to one end of said pivoted lever, said first spring seat also being provided with a pair of diametrically arranged brackets each of which is provided with a U-shaped slot,
  (b) a pair of yokes each provided with a U-shaped slot complementary to the U-shaped slot in one of said brackets, each of said yokes being secured to a corresponding one of said brackets,
  (c) a second spring seat rigidly secured to said traveling nut and having a pair of diametrically arranged and oppositely extending trunnions each disposed in a corresponding one of said elongated slots, and
  (d) spring means interposed between said first and second spring seats and effective to bias said first and said second spring seats apart whereby the diametrically arranged trunnions on said second spring seat are each yieldingly urged toward one end of the corresponding elongated slot.

9. A unit brake assembly for a vehicle wheel, as claimed in claim 5, further characterized in that said slidably mounted spring biased plunger comprises two rods operably connected by a lost-motion connection for providing movement of one with respect to the other whereby the one of said rods can be moved to its normally locked position notwithstanding one end of the other of said rods contacting the periphery of said hollow rotatably mounted barrel between two of said arcuately spaced-apart indentations thereon, and a spring which constantly exerts a bias on the other of said rods.

10. A unit brake assembly for a vehicle wheel, as claimed in claim 1, further characterized in that a switch device having at least one movable contact member and an operating plunger for actuating said at least one movable contact member is closed in response to rocking of said pivoted lever in said one direction and opened in response to rocking of said pivoted lever in said opposite direction, and in that slip clutch is interposed between said pivoted lever and said operating plunger whereby said operating plunger is moved in one direction to effect movement of said movable contact member to close said switch device in response to the initial rocking of said pivoted lever from a brake release position toward a brake applied position, and is moved in an opposite direction to cause movement of said movable contact member to open said switch device in response to the initial rocking of said pivoted lever from a brake applied position toward a brake release position.

11. A unit brake assembly for applying a braking force to a wheel of a railway car truck said unit brake assembly comprising in combination:
  (a) a casing fixed with respect to the car truck,
  (b) brake shoe means pivotally mounted on said casing exteriorly thereof,
  (c) a brake lever rockably mounted at one end on said casing,
  (d) a rigid rod pivotally connected at one end to said brake shoe means and at its other end to said brake lever whereby rocking of said brake lever in one direction effects movement of said brake shoe means into braking contact with the tread surface of a corresponding wheel of the railway car truck, and rocking of said lever in the opposite direction effects movement of said brake shoe means away from said tread surface,
  (e) a bearing member mounted on said casing,
  (f) a screw-threaded member having one end thereof rotatably mounted in said bearing member,
  (g) a traveling nut means for said screw-threaded member and being operatively connected through a yieldable lost-motion connection to the other end of said brake lever,
  (h) a torque motor having an armature shaft driven in one direction upon the supply of electric current to said torque motor,
  (i) a stop for limiting the travel of said traveling nut in the direction to rock said brake lever in said opposite direction,
  (j) planetary gear means comprising:
    (i) a sun gear fixed on the armature shaft of said torque motor for rotation therewith,
    (ii) a planet carrier having a plurality of gears rotatably mounted thereon each having a line of contact with said sun gear, said planet carrier being provided with a hollow hub that is rotatably mounted on the armature shaft of said torque motor for supporting therein the opposite end of said screw-threaded member which is rigidly secured thereto for rotation therewith, and
    (iii) a releasably locked internal gear member having a line of contact with the plurality of gears rotatably mounted on said planet carrier,
  (k) a spiral spring having its inner end anchored to the hub of said planet carrier and its outer end anchored to said releasably locked internal gear member, said spiral spring being effective, upon rotation of said releasably locked internal gear member in one direction, while unlocked, by said torque motor through the intermediary of said sun gear and said plurality of gears, without rotative movement therebetween, to transmit a force to the hub of said planet carrier to cause rotation thereof and also the rotation of said screw-threaded member therewith to effect movement of said traveling nut therealong until said nut abuts said stop, the rotation of said sun gear thereafter being effective to drive said unlocked internal gear member, through the intermediary of the rotation of said plurality of gears, in the opposite direction thereby to completely wind up said spiral spring about the hub of said planet carrier, and
  (l) manually operable means for effecting locking and unlocking of said releasably locked internal gear member of said planetary gear means.

12. A unit brake assembly for applying a braking force to a wheel of a railway car truck, as claimed in claim 10, further characterized in that said planetary gear means comprises:
  (a) a pair of planetary gear units each of which includes:
    (i) a sun gear having a hub formed integral therewith, the hub of one of said sun gears being rigidly mounted on the armature shaft of said torque motor for rotation therewith,
    (ii) a planet carrier having a plurality of spur gears rotatably mounted thereon, each of which has a line of contact with the corresponding sun gear, and being provided with a hollow hub, the hollow hub of the planet carrier of one of said planetary gear units being rotatably mounted on the armature shaft of said torque motor and the hollow hub of the planet carrier of the other of said planetary gear units supporting therein the opposite end of said screw-threaded member which is rigidly secured thereto for rotation therewith, and
    (iii) an internal gear member that has a line of contact with the plurality of gears rotatably mounted on the corresponding planet carrier and in that said unit brake assembly includes a one-way clutch means connecting one of said internal gear members to said casing which one-way clutch means is operable in response to rotation in only one direction of the corresponding plurality of gears to lock said one internal gear member against rotation whereby the rotation of said corresponding plurality of gears in said only one direction is effective to drive the corresponding sun gear in an opposite direction.

13. A unit brake assembly for a vehicle wheel, as claimed in claim 1, further characterized by:
(a) a planetary gear unit operatively interposed between said power means and screw-threaded member through which rotation of said screw-threaded member is effected in response to the supply of power to said power means, and
(b) a one-way slip clutch interposed between said planetary gear unit and said power means for interrupting the drive connection between the power means and the planetary gear unit when, due to the unwinding of the spiral spring by the release of the outer end thereof in response to the operation of said manually operable means, operation of the power means in an opposite direction by said planetary gear unit tends to occur.

14. A unit brake assembly for a vehicle wheel, as claimed in claim 3, further characterized by a one-way slip clutch operatively connecting the sun gear of said planetary gear unit to said power means and so arranged as to provide a driving connection from the power means to the sun gear and preventing driving of the power means reversely by rotation of said sun gear.

15. A unit brake assembly for applying a braking force to a wheel of a railway car truck, said unit brake assembly comprising in combination:
(a) a casing fixed with respect to the car truck,
(b) brake shoe means pivotally mounted on said casing exteriorly thereof,
(c) a brake lever rockably mounted at one end on said casing,
(d) a rigid rod pivotally connected at one end to said brake shoe means and at its other end to said brake lever whereby rocking of said brake lever in one direction effects movement of said brake shoe means into braking contact with the tread surface of a corresponding wheel of the railway car truck, and rocking of said lever in the opposite direction effects movement of said brake shoe means away from said tread surface,
(e) a bearing member mounted on said casing,
(f) a screw-threaded member having one end thereof rotatably mounted in said bearing member,
(g) a traveling nut means for said screw-threaded member and being operatively connected through a yieldable lost-motion connection to the other end of said brake lever,
(h) a torque motor having an armature shaft driven in one direction upon the supply of electric current to said torque motor,
(i) a stop for limiting the travel of said traveling nut in the direction to rock said brake lever in said opposite direction,
(j) a pair of planetary gear units each comprising:
(i) a sun gear having a hub formed integral therewith, the hub of one of said sun gears being rigidly mounted on the armature shaft of said torque motor for rotation therewith,
(ii) a planet carrier having a plurality of gears rotatably mounted thereon, each gear carried by each planet carrier having a line of contact with the corresponding sun gear, each planet carrier being provided with a hollow hub, the hollow hub of the planet carrier of one of said planetary gear units being rotatably mounted on the armature shaft of said torque motor and drivingly connected to the hub of the other of said sun gears and the hollow hub of the planet carrier of the other planetary gear unit supporting therein the opposite end of said screw-threaded member which is rigidly secured thereto for rotation therewith, and
(iii) an internal gear member that has a line of contact with the plurality of gears rotatably mounted on the corresponding planet carrier,
(k) a one-way clutch operable in response to rotation in only one direction of the corresponding plurality of gears to lock said one internal gear member against rotation with respect to the said casing whereby the rotation of said corresponding plurality of gears in said only one direction is effective to drive the corresponding sun gear and armature shaft in an opposite direction,
(l) a spiral spring having its inner end anchored to the hub of the planet carrier, said one planetary gear unit and its outer end anchored to the internal gear member of the said other planetary gear unit, said spiral spring being effective, subsequent to limited rotation of the planet carrier of said one planetary gear unit in one direction effected by said torque motor through the intermediary of the corresponding sun gear, plurality of gears and said one internal gear member while locked against rotation, and limited rotation of the internal gear member of said other planetary gear unit in the opposite direction effected by said limited rotation of the planet carrier of said one planetary gear unit through the intermediary of the sun gear and plurality of gears of said other planetary gear unit, to transmit a force to the internal gear member of said other planetary gear unit to arrest the rotation of this internal gear member which is thereafter effective to arrest rotation of the corresponding plurality of gears to establish a driving connection between the sun gear and carrier of said other planetary gear unit to the hub to which the screw-threaded member is rigidly secured whereby said planet carrier and screw-threaded member are rotated in the direction to effect movement of said traveling nut therealong until said traveling nut abuts said stop, the continued rotation of the planet carrier of said one planetary gear unit thereafter being effective through the sun gear and plurality of gears of the other planetary gear unit to effect continued rotation of the corresponding internal gear member until said spiral spring is completely wound up, and
(m) manually operable means for effecting locking and unlocking of the internal gear member of said other planetary gear unit.

16. A unit brake assembly for spplying a braking force to a wheel of a railway car truck, as claimed in claim 12, further characterized in that said one-way clutch means includes a flexible band disposed about one of said internal gear members, said band having one end rigidly anchored to said casing and the opposite end yieldably connected to said casing whereby said flexible band is tightened about said internal gear member in response to the rotation thereof in only one direction.

17. A brake system for wheeled railway vehicles comprising in combination:
(a) a unit brake assembly for each of a plurality of wheels, each of said unit brake assemblies comprising:
(i) brake shoe means for applying a braking force to a vehicle wheel,
(ii) a pivoted lever effective upon rocking in one direction to apply said brake shoe means and upon rocking in the opposite direction to release said brake shoe means,
(iii) a screw-threaded member rotatably mounted for rotation on its longitudinal axis,
(iv) a traveling nut operatively associated with said screw-threaded member and yieldably connected to said pivoted lever so as to rock said lever in opposite directions corresponding to the direction of travel of said traveling nut on said screw-threaded member,
(v) a spiral spring connected at one end to said screw-threaded member so as to be wound up upon rotation of the screw-threaded member in one direction and effective to exert a force tending to rotate said screw-threaded member in the opposite direction,
(vi) releasable locking means connected to the opposite end of said spiral spring to anchor said opposite end against movement when locked, and
(vii) power means effective in response to the supply of power thereto to cause rotation of said screw-threaded member in one direction to cause travel of said traveling nut in a direction to rock said pivoted lever to release said brake shoe means and to maintain it there and at the same time to cause wind up of said spiral spring, and
(b) a manually operable release mechanism operably connected to the releasable locking means of the unit brake assembly for each wheel of the railway vehicle for operating the releasable locking means of said unit brake assemblies simultaneously to effect complete unwinding of the corresponding spiral springs whereby to cause a complete release of a spring-applied brake application effected in response to loss of power to said power means.

18. A brake system for a railway vehicle truck having four wheels, two on each side of said truck comprising in combination:
(a) a unit brake assembly for each of the four wheels of the railway vehicle truck, each of said unit brake assemblies comprising:
(i) brake shoe means for applying a braking force to the corresponding wheel,
(ii) a pivoted lever effective upon rocking in one direction to apply said brake shoe means and upon rocking in the opposite direction to release said brake shoe means,
(iii) a screw-threaded member rotatably mounted for rotation on its longitudinal axis,
(iv) a traveling nut operatively associated with said screw-threaded member and yieldably connected to said pivoted lever so as to rock said lever in opposite directions corresponding to the direction of travel of said traveling nut on said screw-threaded member,
(v) a spiral spring connected at one end to said screw-threaded member so as to be wound up upon rotation of the screw-threaded member in one direction and effective to exert a force tending to rotate said screw-threaded member in the opposite direction,
(vi) releasable locking means connected to the opposite end of said spiral spring to anchor said opposite end against movement when locked, and
(vii) power means effective in response to the supply of power thereto to cause rotation of said screw-threaded member in said one direction to cause travel of said traveling nut in a direction to rock said pivoted lever to release said brake shoe means and to maintain it there and at the same time to cause wind up of said spiral spring,
(b) a brake release linkage operatively connected to the releasable locking means of the pair of unit brake assemblies for the two wheels on each respective side of the railway car truck, and
(c) means operatively connecting the linkage for the pair of unit brake assemblies for the two wheels on one side of the truck to the linkage for the pair of unit brake assemblies for the two wheels on the other side of the truck whereby, upon the application of a manual force to effect operation of one of said linkages, the brake applying force of all four of the unit brake assemblies may be simultaneously released.

19. A brake system for wheeled railway vehicles, as claimed in claim 18, further characterized in that the brake release linkages for each pair of unit brake assemblies on the same side of the railway vehicle comprises:
(a) a link pivotally connected at one end of the releasable locking means of one of said pair of unit brake assemblies, and
(b) a U-shaped latch member having a clevis formed at the bight thereof to which clevis the other end of said link is pivotally connected, said latch member also having a polygonal-shaped hub at the end of at least one leg thereof to which hub the releasable locking means of the other of said pair of unit brake assemblies is pivotally connected whereby the application of a torque to said at least one hub effects simultaneous operation of the releasable locking means of said pair of unit brake assemblies to release the opposite end of the spiral spring of each unit brake assembly thereby effecting a manual release of the corresponding braking force exerted by each brake assembly.

20. A brake system for wheeled railway vehicles, as claimed in claim 19, further characterized in that the bight of each U-shaped latch member is moved into contact with the corresponding link to limit movement of said U-shaped latch member in response to the application of torque thereto.

21. A brake system for wheeled railway vehicles, as claimed in claim 19, further characterized in that said link of the manually operable release mechanism for each pair of unit brake assemblies on the same side of the railway vehicle comprises two rods, each of which is threaded at one end, and a turnbuckle connecting the threaded end of said two rods whereby the length of said link can be varied to adjust said manually operable release mechanism for use on railway vehicles having different wheel bases.

22. A unit brake assembly for applying a braking force to a wheel of a railway car, as claimed in claim 15, further characterized in that the hollow hub of one of said planet carriers is rotatably mounted on a first bearing means supported by and carried on the armature shaft of said torque motor, and in that the hollow hub of the other of said planet carriers is mounted on said screw-threaded member that is rotatably mounted in a second bearing means supported by the sun gear of one of said pair of planetary gear units.

23. A unit brake assembly for a vehicle wheel, as claimed in claim 2, further characterized in that said planetary gear unit comprises a plurality of gears, the relative number of teeth thereon being so chosen as to insure that said planetary gear unit has a gear ratio that provides a mechanical advantage between said spiral spring and said pivoted lever.

24. A unit brake assembly for a vehicle wheel, as claimed in claim 2, further characterized in that said planetary gear unit comprises a plurality of gears, the relative number of teeth thereon being so chosen as to insure that said planetary gear unit has a gear ratio that provides a mechanical advantage between said power means and said spiral spring.

References Cited by the Examiner
UNITED STATES PATENTS
3,131,788   5/1964   Newell _____ 188—153

DUANE A. REGER, *Primary Examiner.*